US006696149B2

(12) United States Patent
Kobayashi et al.

(10) Patent No.: US 6,696,149 B2
(45) **Date of Patent: *Feb. 24, 2004**

(54) IMAGE STRIPPING MEMBER, AND IMAGE STRIPPING APPARATUS AND IMAGE STRIPPING METHOD USING THE IMAGE STRIPPING MEMBER

(75) Inventors: Tomoo Kobayashi, Minami-Ashigara (JP); Kaoru Torikoshi, Minami-Ashigara (JP); Tadakazu Ezure, Ashigarakami-gun (JP)

(73) Assignee: Fuji Xerox Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,932

(22) Filed: Dec. 30, 1997

(65) Prior Publication Data

US 2003/0077441 A1 Apr. 24, 2003

(30) Foreign Application Priority Data

Jan. 7, 1997 (JP) .......... 9-000853
Jun. 23, 1997 (JP) .......... 9-166305
Dec. 26, 1997 (JP) .......... 9-360968

(51) Int. Cl.[7] .......... B32B 15/04; B32B 7/12
(52) U.S. Cl. .......... 428/343; 428/349; 428/355 RA
(58) Field of Search .......... 428/343, 349, 428/355 RA

(56) References Cited

U.S. PATENT DOCUMENTS 4,037,008 A * 7/1977 Tugwell .......... 428/200
4,950,536 A * 8/1990 Hogarth .......... 428/343
5,114,789 A * 5/1992 Reafler .......... 428/328
5,353,108 A 10/1994 Tsukamoto
5,436,073 A * 7/1995 Williams .......... 428/343
5,474,820 A * 12/1995 Murschall .......... 428/35.7
5,635,005 A * 6/1997 Saitoh et al. .......... 156/234
5,688,573 A * 11/1997 Goeb .......... 428/40.1
5,776,604 A * 7/1998 Lu et al. .......... 428/343
5,965,243 A * 10/1999 Butler .......... 428/195
6,071,596 A * 6/2000 Kawai .......... 428/195

FOREIGN PATENT DOCUMENTS

JP 1-267294 10/1989
JP 1-297294 11/1989
JP 2-55195 2/1990
JP 4-64472 2/1992
JP 5-232737 9/1993
JP 6-208318 7/1994
JP 6-219068 8/1994
JP 6-250569 9/1994
JP 6-250570 9/1994
JP 6-266264 9/1994
JP 6-273966 9/1994

(List continued on next page.)

*Primary Examiner*—Cheryl A. Juska
*Assistant Examiner*—Christopher C. Pratt
(74) *Attorney, Agent, or Firm*—Oliff & Berridge, PLC

(57) ABSTRACT

An image stripping apparatus includes: a stripping roller which strips an image forming material from an image recording medium by contacting the image forming material on the image recording medium; a cleaning roller for removing, from the stripping roller, the image forming material which has been transferred to the stripping roller; and a cleaning blade stripping the image forming material from the cleaning roller. The stripping roller has a surface layer made of a material having affinity and releasability with respect to the image forming material and the image recording medium. Thus, the stripping roller exhibits peelability required for stripping of the image forming material from the image recording medium and releasability required for removal of a transferred image forming material from the stripping roller.

9 Claims, 10 Drawing Sheets

FOREIGN PATENT DOCUMENTS

| | | |
|---|---|---|
| JP | 6-289643 | 10/1994 |
| JP | 7-13383 | 1/1995 |
| JP | 07-110590 | 4/1995 |
| JP | A 7-121068 | 5/1995 |
| JP | 07181713 | 7/1995 |
| JP | A 7-199755 | 8/1995 |
| JP | 8-262937 | 10/1996 |

* cited by examiner

IMAGE STRIPPING MEMBER, AND IMAGE STRIPPING APPARATUS AND IMAGE STRIPPING METHOD USING THE IMAGE STRIPPING MEMBER

BACKGROUND OF THE INVENTION

1. Field of the Invention

The present invention relates to an image stripping member for reproducing an image recording medium with ease by stripping an image forming material from the image recording medium used in a thermal transfer system or an electrophotographic system or the like, and to an image stripping apparatus and an image stripping method using the image stripping member.

2. Description of the Related Art

Currently, the most commonly-used image recording medium is paper. In recent years, the importance of conservation of forest resources has been recognized because of global environmental issues, and it has become important to decrease the use of wood as the raw material of paper. As one approach to decrease the use of wood, waste paper (used paper) is not burned, but is again used as recycled paper. In the utilization of waste paper as recycled paper, however, there are still many problems to be solved.

For example, there exist the following problems in recycling waste paper: leakage of secret documents and secret data of enterprises and the like; time, labor, and transportation involved in classification and collection and the like; and storage space and management for collected waste paper and the like.

Moreover, in the recycling of waste paper, there arise other problems such as the following: fibers of pulp are shortened and the quality of recycled paper is thereby deteriorated since waste paper is decomposed to pulp and a deinking apparatus is required to remove unnecessary ink and the like in images, when virgin pulp is used and the like. There is a further problem that paper manufacturing systems for manufacturing paper from pulp are large-scale, complex and expensive. Therefore, reproduction of waste paper cannot be carried out in offices and homes with ease.

If collection by type of paper, transportation, storage, reproduction and the like are not performed efficiently, a large amount of energy is consumed in these steps, resulting in a large amount of $CO_2$. Consequently, global warming, which is one global environmental problem, may be further accelerated.

On the other hand, from the viewpoint of decreasing the use of petroleum resources, it is important to recycle plastics and the like. Examples of recording members which use plastics as a raw material include films for OHPs (overhead projectors) used in lectures, readings of papers, conference presentations, and the like. In OHP films, a thin image receiving layer is provided on a surface of a transparent film to firmly fix an image forming material thereon. At present, it is difficult to remove only the image forming material from the OHP film without damaging the image receiving layer, so that many sheets of used OHP films are discarded as waste after the film is used only once.

In order to solve such problems, there have been proposed various methods and apparatuses for stripping images from image recording media such as papers, plastic films or the like which have only been used once, by use of an image stripping member and reproducing an image recording medium. Examples of methods and apparatuses in which an image on an image recording medium is removed by a physical means are disclosed in the publications described below.

Japanese Patent Application Laid-Open (JP-A) Nos. 1-297294, 2-55195, 4-64472 and the like disclose the following. An image recording medium and an image stripping member are used. The image recording medium is formed of a material into which the image forming material does not penetrate, or is surface-treated with a releasing material. The image stripping member has a surface which is formed of a thermoplastic resin, e.g., the same resin as the resin of the image forming material, or has a surface on which is applied an adhesive exhibiting adhesiveness at lower temperatures than these resins. The image recording medium on which an image is formed is heated, and the heated image recording medium and the image stripping member are brought into contact with each other so that the fused image forming material is transferred to the image stripping member. The image forming material is removed from the image stripping member after the image forming material has cooled. However, there are problems in that operation must be suspended until the image forming material is cooled in order to peel off the image forming material from the image stripping member, or plain papers for general use and OHP films which are not surface-treated with a releasing material cannot be used in order to prevent an image stripping apparatus becoming inoperable due to strong adhesion of the image recording medium to the image stripping member, with an adhesive or a fused resin on the surface of the image stripping member, such that the image recording material and the image stripping member cannot be separated by a finger or the like.

An image stripping method is disclosed in Japanese Patent Application Laid-Open (JP-A) No. 5-232737 in which a felt roller such as stainless wool is used as an image stripping member, an image forming material on a sheet of paper coated with a releasing agent is softened by heating, and thereafter, the sheet of paper and the image stripping member are brought into contact with each other and the image forming material is removed from the sheet of paper with the help of friction. However, since friction is employed, the image forming material is adhered by rubbing the image forming member against the sheet of paper during stripping. The image forming material adhered by rubbing to the paper remains on the paper, and the reproduced paper thus obtained cannot be put into practical use.

An image stripping method is disclosed in Japanese Patent Application Laid-Open (JP-A) No. 6-219068 in which an image forming material on a sheet of paper, which is surface-treated with a thermally modified material having releasability, is softened by heating and removed by an image stripping member whose surface is made of an adhesive material. However, as is described in Japanese Patent Application Laid-Open (JP-A) No. 1-267294, plain paper and OHP films cannot be used and the image forming material transferred to the image stripping member cannot sufficiently be removed from the image stripping member, so that image peelability markedly deteriorates by repeated usage.

An image stripping method is disclosed in Japanese Patent Application Laid-Open (JP-A) No. 6-208318 in which a sheet of paper on which an image is recorded is immersed in a solution containing a deinking agent such as a surfactant and the like to weaken adhesiveness between the paper and the image forming material. Thereafter, a rotary brush made of polymer fibers such as nylon, acrylic resin, polyester or the like, a textile belt (web), or a blade is pushed on the paper in the solution or a deinking agent is jetted on the sheet through a high pressure nozzle, so that the image is peeled from the paper. There is a further problem, however, in that a long time is required for the solution to penetrate into the paper and for the adhesiveness between the paper and the image forming material to thereby be sufficiently weakened. Further, the image forming material stripped in the solution is again adhered to the paper.

Image stripping methods are disclosed in Japanese Patent Application Laid-Open (JP-A) Nos. 6-250569, 6-250570, 6-266264, 6-273966, 6-289643 and 7-13383, in which an image recording medium is immersed in a solution containing a surfactant. Thereafter, an image stripping member having an outermost layer made of the same resin as that of the image forming material, or an image stripping member made of a resin having a solubility parameter (SP) the same as or similar to that of the resin of the image forming material, or an image stripping member whose outermost layer is made of a pressure sensitive adhesive or an adhesive, or a variety of adhesive tapes, is adhered to the paper while being heated, so that the image forming material is stripped.

In any of these methods, however, there is a problem in that image forming materials which have firmly adhered to receiving members, and image forming materials which have penetrated into the recesses and projections (surface irregularities) of receiving members, and color images with high image densities cause difficulty in that, even if a large quantity of a surfactant is used, it is difficult for the surfactant to sufficiently penetrate between the receiving member and the image forming material, and the surfactant accumulates on the image stripping member by repeated use. Adhesiveness between the image stripping member and the image forming material is thereby weakened, and image peelability is reduced. If an image stripping member with a strong adhesive layer is used or the process of immersing an image recording medium in a solution is omitted in order to prevent such a problem, it is hard to remove (clean) an image forming material from an image stripping member or the image forming material adheres to the image stripping member, so that there arises another problem in that the image stripping apparatus is inoperable.

A method is proposed in Japanese Patent Application Laid-Open (JP-A) No. 8-262937, in which a solution of a surfactant and the like is held on a receiving member on which an image has been recorded for the purpose of achieving both peelability and cleanability, and there is used a stripping material having portions with respectively different adhesive forces to an image forming material in regions corresponding to sizes of images.

However, in actual use, there arise problems in that it is hard to manufacture an image stripping member having portions with different adhesive forces in a controlled manner, and an image forming material adhered to a region of low adhesive force to the image forming material does not have a sufficient fixing property so that image stability deteriorates.

SUMMARY OF THE INVENTION

The present invention has been made in light of the above, and an object thereof is to provide an image stripping member which enables easy reproduction of an image recording medium in an office or home, which maintains good image peelability over a long time, and which is applicable to general image recording media, and to an image stripping apparatus and an image stripping method using the image stripping member.

As a result of intensive research on image stripping members with which image recording media can be reproduced with ease, the present inventors have found that the above-mentioned object can be achieved by using an image stripping member having both properties of affinity and releasability with respect to an image forming material, and by using an image stripping apparatus and an image stripping method using the image stripping member, and have achieved the present invention based on these findings.

The present invention provides an image stripping member, which is used for stripping an image forming material from an image recording medium by contacting the image forming material on the image recording medium, wherein a material forming a surface layer of the image stripping member has affinity and releasability with respect to the image recording material.

The material forming the surface layer may contain a releasing material and an affinitive material, or may contain a material having both releasability and affinity. When the surface layer contains a releasing material, the content thereof is preferably in a range of 5 to 80% by weight.

The image stripping member may be structured such that a plurality of holes each having a bottom may formed in the surface layer of the image stripping member, and a material having releasability with respect to the image recording material or a material having both releasability and affinity with respect to the image recording material may be filled in the holes.

The affinitive material may be a pressure sensitive adhesive or a thermally-fusible material. The melting point of the thermally-fusible material preferably is in the range from a temperature which is 20° C. lower than the melting point of the image forming material to a temperature which is 50° C. higher than the melting point of the image forming material. More preferably, the thermally-fusible material is the same resin as the resin included in the image forming material.

Further, the thermally-fusible material is preferably mixed with a releasing material homogeneously, and for the purpose of homogeneous mixing, a compatibilizing agent, which improves the compatibility between the thermally-fusible material and the releasing material, or a plasticizer, can be included in the material forming the surface layer.

The material forming the surface layer can contain a material having both releasability and affinity, which material preferably is a resin containing a component for imparting releasability. The content of the component for imparting releasability is preferably in the range of 7 to 25% by mol.

In order to improve contact between an image forming material and an image stripping member in conformity with the irregularity of the surface of the image recording medium, formed by the image forming material, fine particles can be included in the surface layer, or an elastic layer made of silicone rubber or the like can be inserted between a substrate of the image stripping member and the surface layer. Releasing materials used preferably are a silicon compound such as an organic silicon compound, silicone rubber, silicone resin, silicone oil or a mixture thereof.

The present invention also provides an image stripping apparatus comprising: an image stripping member having a surface layer having affinity and releasability with respect to an image recording material; an image stripping means for stripping the image forming material from an image recording medium by making the image stripping member contact the image forming material on the image recording medium and heating the image recording medium; and a removing means for removing, from said image stripping member, the image forming material which has been transferred to the image stripping member from the image recording medium.

The above image stripping apparatus may comprise reducing means for reducing adhesiveness between the image recording medium and the image forming material, and/or second applying means for applying a releasing material on the surface of the image recording medium.

The present invention also provides an image stripping method comprising the steps of: stripping an image forming material from an image recording medium by making an image stripping member contact the image forming material on the image recording medium and heating the image recording medium, the image stripping member having a surface layer having affinity and releasability with respect to an image recording material; and removing, from the image stripping member, the image forming material which has been transferred to the image stripping member from the image recording medium.

The image stripping method can further comprise the step of reducing adhesiveness between the image recording medium and the image forming material before the step of bringing the image stripping member into contact with the image forming material on the image recording medium.

In the step of reducing the adhesiveness, the adhesiveness between the image recording medium and the image forming material can be reduced by heating the image forming material on the image recording medium.

In addition, in the step of stripping, the image forming material on the image recording medium may be heated.

In an image stripping method of the present invention, a well known image recording medium can be used, but an image recording medium made of a material whose surface layer has releasability with respect to an image recording material is preferably used.

The following description uses an electrophotographic method as an example. In general, an electrostatic charge is uniformly applied to a surface of an electrophotographic photoreceptor, and thereafter the surface is subjected to exposure on the basis of image information obtained from an original to form an electrostatic latent image. Then, an image forming material (toner) is supplied to the electrostatic latent image of the photoreceptor from a developing device to make the electrostatic latent image a visible image. The visible image is transferred to an image recording medium, and finally, the image forming material is fixed on the image recording medium by heat, pressure or the like.

Therefore, it can easily be understood that, in the case where an image is fixed by heat on an image recording medium, the image forming material is fused by heating the image recording medium again and adhesiveness between the image recording medium and the image forming material is reduced, so that the image forming material is easily peeled off from the image recording medium. However, if plain paper is used as an image recording medium, an amount of image forming material remains on the surface of the paper only by the heating treatment, to the extent that characters or images can be recognized or identified by the human eye. This is because the image forming material is made of a material with high affinity with paper fibers for the purpose of improving fixability.

If an image stripping member made of a material having high affinity with an image forming material, for example, an image stripping member made of the same type of resin as that of the image forming material, is brought into contact with an image forming material on an image recording medium under a condition that the image forming material is fused, the image forming material is transferred to the image stripping member from the image recording medium, and the image recording material can thereby be removed from the image recording medium.

However, in a conventional image stripping member, an image forming material, which is transferred to an image stripping member from an image recording medium, is difficult to be stripped from an image stripping member having high affinity to the image forming material and the image forming material is heterogeneously overlaid on the image stripping member due to use over a long period of time, so that peelability is greatly reduced. On the other hand, according to the present invention, since the surface layer of the image stripping member is made of a material having affinity and releasability with respect to the image recording material, even an image forming material, which is transferred to the image stripping member from the image recording medium, is easily removed from the image stripping member. Therefore, the peelability of the initial stages can be maintained over a long period of time.

The material forming the surface layer of the image stripping member of the present invention is obtained by combining an affinitive material having a large adhesive force with respect to an image forming material and a releasing material having a small adhesive force with respect to the image forming material, the mixing ratio being arbitrarily changeable. In this way, the adhesive force with respect to the image forming material can be controlled with ease, and even the adhesive force with respect to plain paper or OHP films, which have large adhesive forces with respect to the image stripping member, can also be controlled. Therefore, even if plain paper or a generally used OHP film is fed to the image stripping apparatus of the present invention, unsatisfactory winding of a paper sheet or an OHP film to the stripping member, which has conventionally been problematic, is prevented, so that there is no need for distinguishing plain paper from recycled paper.

DESCRIPTION OF THE PREFERRED EMBODIMENTS

Figure 1:
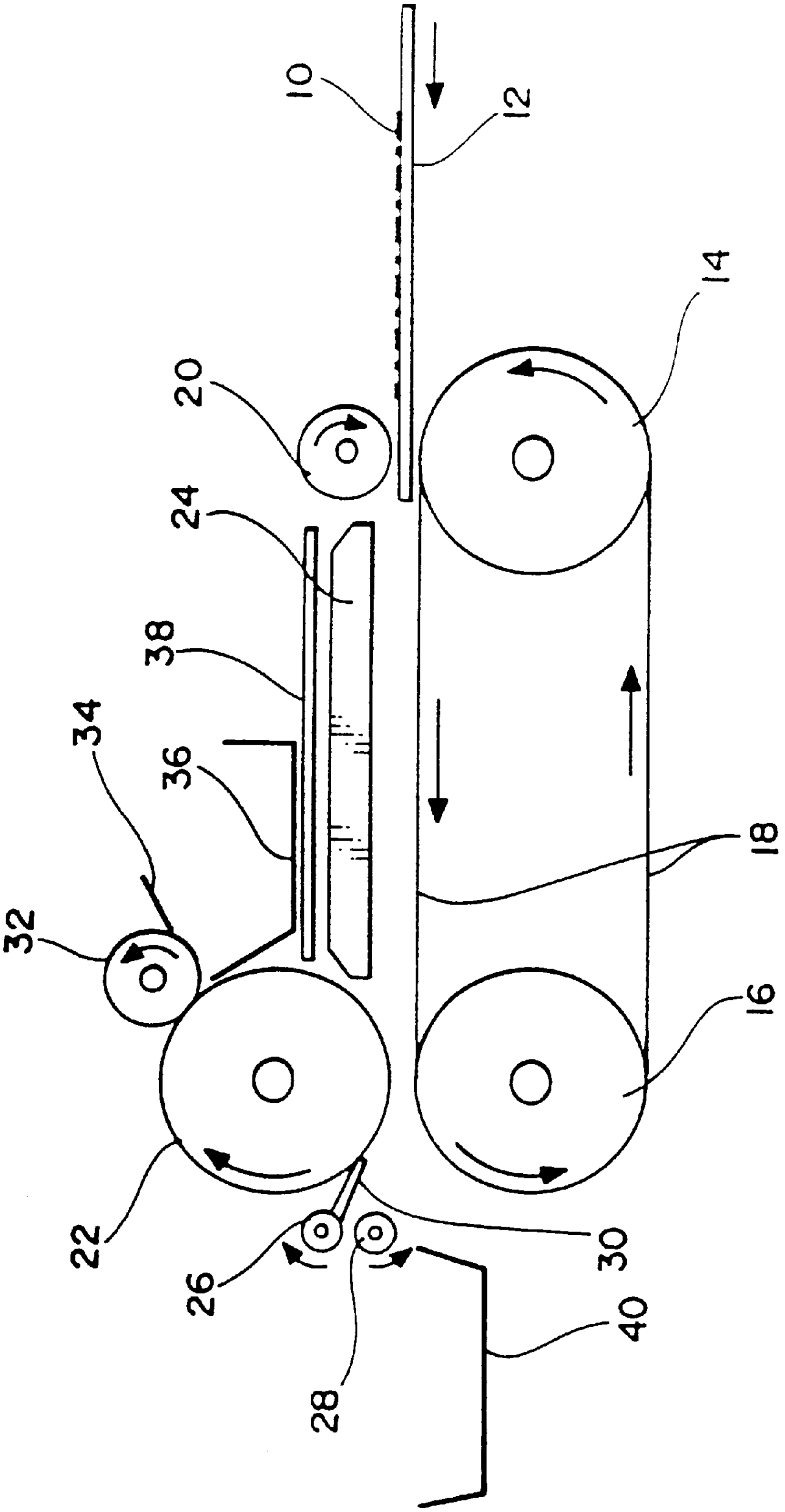
FIG. 1 is a schematic view showing a structure of an image stripping apparatus according to a first embodiment of the present invention, in which an image recording medium is inserted into the image stripping apparatus.

The present invention will be described in detail hereinafter.

An image stripping member of the present invention is not specifically limited and can be any material in so far as it has a layer on a substrate, and a material forming the surface layer of the layer has affinity and releasability with respect to an image forming material or an image recording material of an image recording medium, and in regard to the affinity and releasability with respect to the image recording material, the affinity may independently be imparted by an affinitive material and the releasability may independently be imparted by a releasing material or the affinity and releasability may be imparted by a material having both properties.

From the viewpoint of ease of material designing, the material forming the surface layer preferably contains a releasing material and an affinitive material, but if homogeneous mixing of the releasing material and the affinitive material is difficult, a material having both affinity and releasability is preferably contained.

Examples of substrates for the image stripping member of the present invention include: various kinds of heat resistant metals, such as aluminum, nickel, platinum, zinc, copper, iron, stainless steel and the like; alloys of these metals and these metals with the surfaces thereof subjected to an oxidation treatment; and sintered products of aluminum oxide, titanium oxide, zirconium oxide, calcium phosphate, barium titanate or the like. Heat resistant resin films such as of polyimide, polyamide, polycarbonate, polyphenylene sulfide, polyethylene phthalate and the like can also be effectively used.

The material forming the surface layer of the image stripping member may be either a liquid material or a solid material, but a solid material is more preferably used in consideration of being able to be used without mobility in a stable manner. The liquid material and the solid material can be used together in combination.

A releasing material used in the surface layer of an image stripping member of the present invention is not specifically limited and may be any material in so as far as it has releasability with respect to an image forming material and an image recording material. More specifically, examples include: a fluorine compound, wax, a silicon compound and the like, and they may be used alone or in combination.

Among these materials, silicon compounds are preferable in consideration of compatibility with affinitive materials and safety.

Examples of fluorine compounds include: fluorine-based polymers, fluorine-based oils and the like.

Specific examples of fluorine-based polymers include: a polymer and a copolymer synthesized from a fluorine containing-monomer such as vinylidene fluoride, trifluoroethylene, chlorotrifluroethylene, tetrafluoroethylene, pentafluoropropylene, hexafluoropropylene or the like; a copolymer synthesized from the above fluorine-containing monomer and ethylene, (perfluoro) alkenyl vinyl ether or acrylic resin; and a polymer having a perfluoroaliphatic ring structure such as a polymer produced by cyclic polermerization of perfluoroalkenyl vinyl ether or the like. Moreover, a material which is manufactured as an elastomer (rubber) from the above mentioned polymer, a fluorine-based oil or the like can be used as well.

Examples of fluorine-based oils include: perfluoropolyethers represented by $X—CF_2(OC_2F_4)_p(OCH_2)_qOCF_2—X$; and more specifically, an isocyanate-modified perfluoropolyether in which X is $OCN—C_6H_3(CH_3)NHCO—$, a carboxyl-modified perfluoropolyether in which X is —COOH, an alcohol-modified perfluoropolyether in which X is $—CH_2OH$ or $—CF_2CH_2(OCH_2CH_2)_nOH$, and a ester-modified perfluoropolyether in which X is —COOR and the like.

Examples of waxes include: a polyethylene wax with a low molecular weight, an oxygen convertible polyethylene wax with a low molecular weight, a polypropylene wax with a low molecular weight, an oxygen convertible polypropylene wax with a low molecular weight, a higher fatty acid wax, a higher fatty acid ester wax, sazole wax, carbauna wax, bees wax, montan wax, a paraffin wax, a microcrystalline wax and the like.

Examples of silicon compounds include: organic silicon compounds, silicone rubbers, silicone resins, silicone oils and the like. Examples of organic silicon compounds include: silane compounds, fluorine-containing silane compounds, and isocyanate silane compounds.

Examples of silane compounds include: alkoxy silanes, such as $Si(OCH_3)_4$, $CH_3Si(OCH_3)_3$, $(2H_3)_2Si(OCH_3)_2$, $C_6H_5Si(OCH_3)_3$, $Si(OC_2H_5)_4$, $CH_3Si(OC_2H_3)_3$, $(CH_3)_2Si(OC_2H_5)_2$, $C_6H_5Si(OC_2H_5)_3$, $(CH_3)_2CHCH_2Si(OCH_3)_2$, silazanes such as $(CH_3)_3SiNHSi(CH_3)_2$, special silylating agents, such as $((CH_3)SiNH)_2CO$, tert-$C_4H_9(CH_3)_2SiCl$ and the like, silane coupling agents, silane compounds, such as $HSC_3H_6Si(OCH)_3$, and hydrolysates and partial condensates of the above mentioned compounds. Examples of silane coupling agents include: vinylsilanes such as vinyltrichlorosilane, vinyltris (β-methoxyethoxy)silane, vinyltriethoxysilane, vinyltrimethoxysilane and the like; acrylic silanes, such as γ-methacryloxypropyltrimethoxysilane; epoxysilane, such as β-(3,4-epoxycyclohexyl)ethyltrimethoxysilane, γ-glycidoxypropyltrimethoxysilane, γ-glycidoxypropylmethyldiethoxysilane and the like; and aminosilanes, such as N-β-(aminoethyl) γ-aminopropylmethoxysilane, N-β-(aminoethyl) γ-aminopropylmethyldimethoxysilane, γ-aminopropyltriethoxysilane, N-phenyl-γ-aminopropyltrimetoxysilane and the like.

As fluorine-containing silane compounds, fluorine-containing silicon compounds containing a perfluoroalkyl group are preferably used in order to improve releasability, and specific examples thereof include: $C_6F_{13}C_2H_4Si(OCH_3)_3$, $C_7F_{15}CONH(CH_2)_3Si(OC_2H_5)_3$, $C_8F_{17}C_2H_4Si(OCH_3)_3$, $C_8F_{17}C_2H_4SiCH_3(OCH_3)_2$, $C_8F_{17}C_2H_4Si(ON{=}C(CH_3)(C_2H_5))_3$, $C_9F_{19}C_2H_4Si(OCH_3)_3$, $C_9F_{19}C_2H_4Si(NCO)_3$, $(NCO)_3SiC_2H_4C_6F_{12}C_2H_4Si(NCO)_3$, $C_9F_{19}C_2H_4Si(C_2H_5)(OCH_3)_2$, $(CH_3O)_3SiC_2H_4C_8F_{16}C_2H_4Si(OCH_3)_3$, $(CH_3O)_2(CH_3)SiC_9F_{18}C_2H_4Si(CH_3)(CH_3O)_2$ and the like; and hydrolysates and partial condensates and the like.

Examples of isocyanate silane compounds include: $(CH_3)_3SiNCO$, $(CH_3)_2Si(NCO)_2$, $CH_3Si(NCO)_3$, vinylsilyltriisocyanate, $C_6H_5Si(NCO)_3$, $Si(NCO)_4$, $C_2H_5OSi(NCO)_3$, $C_8H_{17}Si(NCO)_3$, $C_{18}H_{37}Si(NCO)_3$, $(NCO)_3SiC_2H_4Si(NCO)_3$ and the like.

Silicone rubber can be classified into a mirrorable type and a liquid type. Mirrorable type silicon rubbers include silicone rubbers which are produced in such a manner that a linear polyorganosiloxane with a high degree of polymerization, such as a dimethyl type, a methylvinyl type, a methylphenylvinyl type, a methylfluoroalkyl type or the like is used as the main material, and reinforcing filler and a variety of other additives are mixed thereinto, and the thus prepared composites are cured by heating after addition of a vulcanizing agent. Types of liquid silicone rubbers include: a condensation type silicone rubber which is cured at room temperature, an addition type silicone rubber which is cured by heating in the presence of a platinum type catalyst, an ultraviolet curable type silicone rubber, and the like. Further, another example is a silicone rubber which is produced as an elastomer from the above mentioned silane compound.

Types of silicone resins include: a silicone resin produced by polymerization of the above silane compound, a curable type silicone resin, and the like. A curable silicone resin can be synthesized by condensation of silanols obtained by hydrolysis of a chlorosilane having three or more functional groups or a mixture thereof with a chlorosilane having one or two functional groups to form apolysiloxane, and a condensation reaction (curing reaction) is further carried out by use of a metal salt of an organic acid or an amine as a catalyst to obtain the curable type silicone resin. From the viewpoint of the curing reaction, a silicone resin, which is curable upon exposure to humidity or heat or an energy ray such as light, an electron beam or the like, is preferred.

Examples of silicone oils include: silicone oils of a dimethylpolysiloxane or methylphenylpolysiloxane type; a methylhydrogensilicone oil; and a reactive silicone oil into which a reactive group is introduced. Examples of reactive silicone oils include: amino-modified silicone oils, epoxy-modified silicone oils, carboxyl-modified silicone oils, carbinol-modified silicone oils, methacrylic-modified silicone oils, mercapto-modified silicone oils, phenol-modified silicone oils, fluorine-modified silicone oils and the like. If these silicone oils are used in a mixture with an above mentioned silane compound, releasability of an image stripping member is markedly improved.

While the content ratio of the releasing material in the surface layer of the image stripping member is dependent on the types of releasing materials and the types of affinitive materials used together with the releasing material, it is preferably in the range of 5 to 80% by weight, or more preferably in the range of 25 to 70% by weight. If the content ratio of the releasing material in the surface layer is less than 5% by weight, the action of the adhesive agent is stronger and the image recording medium is thereby adhered in a winding manner to the image stripping member, so that an image forming material transferred to the image stripping member cannot be removed from the image stripping member and the image forming material is accumulated on the surface of the image stripping member and thus the original releasability cannot be maintained, even though the winding manner can be avoided. On the other hand, if the content ratio exceeds 80% by weight, the releasability is stronger, and thus the image forming material cannot be removed from the image recording medium.

The releasing materials of the present invention may be used singly or in combination.

If the releasing material as described above is incorporated into a material forming the surface layer of the image stripping member, the adhesion of the image recording medium on the image stripping member can be greatly improved.

The affinitive material used in the surface layer of the image stripping member of the present invention is not specifically limited and can be any material having affinity and compatibility with the image forming material of the image recording medium and the like. For example, color toners fundamentally comprise yellow, magenta and cyan, i.e., the three primary colors, and a variety of colors is reproduced by using the three types of toners. For this reason, in general, when three types of toners are used, toner layers equivalent to two more colors are overlapped and built up more than the black toner. In order to fix the color toner layers, it is necessary that either a temperature of a heating heater is raised or a fusing temperature of the toners is lowered. However, in the former case, there are problems with regard to safety and in that there is an increase in energy consumption. Therefore, the physical properties of a color toner, such as thermal responsiveness and the like, are made to vary in accordance with types of image forming materials, for example, in such a manner that the color toner is made of a material which is fusible at a lower temperature, compared with that of a black toner used in a regular monochromatic copier. Thus, an affinitive material suitable for peeling respective image recording materials must be selected.

Affinity and compatibility with an image forming material can be evaluated by, for example, a solubility parameter (SP value), which is derived from a partial structural unit of a chemical structural formula. As SP values of materials are closer to each other, that is, as chemical structures are more similar to each other, the materials have higher affinity and compatibility.

Therefore, as an affinitive material of the present invention, an affinitive material having an SP value within the range of ±1.0 of an SP value of the image forming material to be used can suitably be used. More specifically, an affinitive material having an SP value in the range of 8.0 to 12.0 $(cal/cm^3)^{1/2}$ can suitably be used.

As an affinitive material of the present invention, a material which exhibits a thermal fusing property similar to the image forming material is preferred. A thermally-fusible material having a fusing temperature in the range from a temperature which is 20° C. lower than the fusing point of the image forming material to a temperature which is 50° C. higher than the fusing temperature thereof is more preferable. Among materials showing such a property, the same resin as a resin used in the image forming material is particularly preferable.

Specifically, the affinitive materials include: styrene-based resins such as a polymer or copolymer of styrene or parachlorostyrene or the like; vinyl-based resins such as a polymer or copolymer of methyacrylate, methyl methacrylate or the like; olefin-based resins, such as a polymer or copolymer of ethylene or propylene; thermoplastic resins such as epoxy resins; polyester resins; polyurethane resins, polyamide resins, polyether resins, polyacetal resins, polycarbonate resins, cellulose resins and the like.

The thermally-fusible material of the present invention is preferably homogeneously mixed with a releasing material. In order to mix homogeneously, a compatibilizing agent for the thermally-fusible material and the releasing material, or a plasticizer, can be added.

As a compatibilizing agent for the thermally-fusible material and the releasing material, known compatibilizing agents can be used. A copolymer of the monomer forming the thermally-fusible material and the monomer forming the releasing material can preferably be used, or a copolymer of the monomer forming the thermally-fusible material, the monomer forming the releasing material, and a monomer having good compatibility therewith can preferably used. A material which is obtained by allowing the monomer forming the releasing material or a reactive releasing material to react with the thermally-fusible material or by allowing the monomer forming the thermally-fusible material to react with a releasing material or the like is also preferred.

A blending ratio of the compatibilizing agent is not specifically restricted, in so far as affinity, compatibility, releasability and the like between the image stripping member and the image forming material do not change the surface characteristics of the image stripping member, but the ratio is preferably in the range of 1% by weight to 30% by weight with respect to the total amount of the thermally-fusible material and the releasing material.

As a plasticizer of the present invention, known plasticizers can be used. Examples of plasticizers include: di-ester phthalate, such as dioctyl phthalate, di-(2-ethylhexyl) phthalate, dinonylphthalate, dilaurylphthalate, dibutyllaurylphthalate, dibutylbenzylphthalate; aliphatic dibasic acid esters, such as di(2-ethylhexyl)adipate, di (2-ethylhexyl)sebacate and the like; triesterphosphates, such as tricresylphosphate, tri(2-ethylhexyl)phosphate and the like; polyethyleneglycol; epoxy aliphatic acid esters and the like.

The blending ratio of the plasticizer is not specifically restricted provided that affinity, compatibility, releasability and the like between the image stripping member and the image forming material do not change the surface characteristics of the image stripping member, but the ratio is preferably in the range of 1% by weight to 30% by weight with respect to the total amount of the thermally-fusible material and the releasing material.

However, in light of operability and the like of the image stripping apparatus, it is preferred that one or several kinds of image stripping members are used for both color toners for color copiers and black toner for monochromatic copiers. Taking into account the melting point of a toner, it is preferable that affinity and compatibility with an image forming material is maintained over a wide range of temperatures. Such affinitive materials include pressure sensitive adhesives.

Examples of pressure sensitive adhesives include a rubber-based adhesive, an acrylic-based adhesive, a vinyl ether polymer based-adhesive, and a silicone adhesive. Among these, a silicone adhesive is preferable, because it has a heat resistance such that it can be used at a temperature at which an image forming material is fused by heating, it has good compatibility with a silicone compound as a releasing material, and peelability and releasability can be maintained over a long period of time in repeated use.

Other affinitive materials which can be effectively used include, for example, a variety of metals, resins and the like having a sufficient heat resistance for use as a substrate for an image stripping member.

Affinitive materials of the present invention may be used singly or in combination.

Materials having releasability and affinity used in the surface layer of the image stripping member of the present invention are not specifically limited provided that each is a single material and has affinity and releasability with respect to the image forming material and the image recording material of the image recording medium. For example, a resin containing a component which imparts releasability can be used.

As components which impart releasability in the present invention, the above-described releasing material can be used. An alkyl succinic acid, an anhydride thereof or an ester thereof, or an alkenyl succinic acid, an anhydride thereof or an ester thereof can preferably be used since these compounds can synthesize a copolymer with a resin material having high affinity with an image forming material.

Resins containing a component which imparts releasability of the present invention are resins which are obtained by polymerizing the above components which impart releasability. The resins comprise a block copolymer and a graft copolymer.

Preferred examples of resins containing a component imparting releasability of the present invention include: resins containing in their structures a component imparting releasability, the resins being exemplified by affinitive materials, such as styrene base copolymers, ethylene base copolymers, polyester base copolymers, acrylic base copolymers or the like. Especially preferable among such resins are polyester base resins which exhibit good adhesiveness with, especially, image forming materials and contain in the structure thereof a component imparting releasability.

When a resin which contains a releasability-imparting component is used, singly or in combination, as the material forming the surface layer, the content ratio of the releasability-imparting component is in the range of 7 to 25% by mol of the total quantity of the monomer. If the content is less than 7% by mol, it is difficult for the releasability effect to be exhibited. If the content is more than 25% by mol, the melting point of the polyester resin is too low and adhesiveness is exhibited when the releasing material is heated and used, so that the releasability effect with an image recording medium is lost. In this case, while a releasing solid material can further be added in order to suppress loss of the releasability effect, the image stripping function, which is originally sought, deteriorates.

The surface layer of the image stripping member of the present invention is formed by applying onto a substrate the above mentioned material as a solution or a dispersion in a liquid state. The following are examples of generally-used methods for applying or permeating the solution or the like: a blade coating method, a wire bar coating method, a spray coating method, a dip coating method, a bead coating method, an air-knife coating method, a curtain coating method, a roll coating method and the like.

The coated film may be dried by air. However, if drying by heat is carried out, the releasability with respect to the image forming material increases even more. The reason for this is not known for certain, but is suspected to be due to the arranging or orienting of the components reacting with the substrate. Any of known methods, such as placing the coated image stripping member into an oven, passing the image stripping member through an oven, or the like may be used as the method for heat drying.

In the image stripping member of the present invention, instead of providing the surface layer containing the releasing material, a plurality of holes may be formed uniformly in the surface layer formed of the affinitive material, and the releasing material may be filled in the holes.

There are surface irregularities (depressions and protrusions) of the recording member which are formed by the image forming material. The maximum size is in the range of 20 to 30 μm. When the image stripping member and the image recording medium are brought into contact with one another, the surface layer of the image stripping member can be made to closely contact the image forming material if the surface layer has fluidity. However, there is sometimes a microscopically small amount of air between the surface of the image stripping member and the image forming material, resulting in insufficient contact. In order to improve the degree of closeness in contact by formation of local pressure, there preferably are surface irregularities of several μm on the surface of the image stripping member. Fine particles are added in the surface layer for this reason.

The shapes of the fine particles are not particularly limited, and, for example, a sphere, a thin plate having an elliptical shape in plan view, a doughnut-like shape, a cube, an irregular shape, or the like may be used. The particle size is preferably in the range of 0.5 μm to 50 μm in diameter or a length in a longitudinal direction, and more preferably in the range of 1 μm to 30 μm.

Examples of materials used for the fine particles include: titanium oxide, aluminum oxide, aluminum sulfate, zirconium oxide, barium titanate, silica, talc, clay (kaolin), calcium carbonate, silicone resin, acrylic resin, styrene resin, styrene-acrylic resin, melamine resin, benzoguanamine resin, melamine-benzoguanamine resin, polyolefin resin and the like. In particular, fine particles of silicone resin, acrylic resin or styrene resin are preferred.

If a resin material is used for the surface layer of the image stripping member, there is the chance that, although the surface layer works elastically, the elastic function will not be sufficiently exhibited depending on the properties of the resin or the thickness of the layer, and thus the image stripping member cannot follow the surface irregularities of the image recording medium. In such a case, to make the image stripping member closely contact the surface irregularities of the image recording medium, an elastic material is used as the substrate of the image stripping member or an elastic layer is inserted between the substrate and the surface layer. In consideration of a case in which the image stripping member is used as a heating medium, it is preferable that the material of the elastic layer is heat resistant, and thus, silicone rubber, Teflon rubber or the like is preferably used.

In the image stripping apparatus and the image stripping method of the present invention, a known image recording medium, in which a recording layer is formed on a substrate made of plain paper, coated paper, metal, ceramic, a plastic film such as an OHP film, or the like can be used. For example, image recording media such as those described below can be used.

Examples of materials used for the substrate of the image recording medium include: paper, metal (aluminum and the like), plastics, and ceramics (alumina and the like). The shape of the substrate is not particularly limited, but it is preferable that the substrate is film-shaped.

In the case where paper is used as the substrate of the image recording medium, examples of pulp which is a raw material for paper are virgin bleached chemical pulps manufactured by chemically treating wood and other fibrous raw materials and being subjected to a bleaching step, the raw material being, for example, hard wood bleached craft pulp, hard wood unbleached craft pulp, hard wood bleached sulfite pulp, soft wood bleached craft pulp, soft wood unbleached craft pulp, soft wood bleached sulfite pulp and soda pulp and the like. Among these, pulp having a higher whiteness is preferred as a raw material for the substrate. Examples of waste paper pulp include waste paper pulp obtained by dissociating unprinted papers of the most whiteness, special whiteness or medium whiteness, and other unprinted waste paper discarded at a book-binding and printing factories and cutting shops; and waste paper pulp obtained by dissociating various kinds of waste paper and deinking them with respectively proper methods, the waste paper being high quality paper, high quality coated paper, medium quality paper, medium quality coated paper, ground wood paper and the like printed by planographic, letterpress, or intaglio printings, or electrophotographic, thermal sensitive, thermal transfer, pressure sensitive, ink jet recording systems, carbon paper or the like and paper hand-written with water soluble or oily ink, or pencil, or newspaper and the like. Among such pulp, waste paper pulp having high whiteness and a low amount of mixed foreign matter is preferred.

As the image recording medium, preferred is an image recording medium whose surface layer is made of a material having releasability with respect to an image recording material. For example, it is also preferred that a releasing material having good releasability with respect to an image forming material is applied on or made to penetrate into the pulp fiber surface of an image recording paper or, if paper is coated, the surface of coated paper, to impart releasability to the substrate surface.

Examples of releasing materials include fluorine-based compounds such as fluorine-based oils, silicon compounds, waxes and the like. However, in consideration of releasability with respect to an image forming material, transferability to members or materials in the apparatus from the substrate surface, traveling of paper and the like, materials which directly bond with pulp fibers by reacting with the pulp fibers are preferred. As releasing materials which directly bond with pulp fibers by reacting with them, silicon compounds are preferred.

The above mentioned compounds can be used as the silicon compounds. These silicon compounds can be used singly or in combination. Other silicon compounds which may be used are silica gel and the like. Among the above mentioned silicon compounds, the following compounds are preferred: fluorine-containing silicon compounds, isocyanate silane compounds, modified silicone oils having a reactive group in the molecule, or mixtures thereof. These silicon compounds are coated on the substrate of the image recording medium or the substrate is dipped in a solution thereof and thereafter dried, so that a coated film having releasability is formed.

When paper is used as the substrate for the image recording medium, in order to improve the fixability to the image forming material, it is preferable that a proper degree of surface irregularity is imparted to the surface of the image recording medium by further adding fine particles to the image recording medium. Thus, since a sufficient fixing force can be obtained merely by allowing an image forming material to stick to substrate fibers or to stick to substrate fibers by enveloping them, the amount of resin used in the image forming material can be reduced. Examples of fine particles include: talc, clay (kaolin), calcium carbonate, titanium oxide, aluminum oxide, aluminum sulfate, zirconium oxide, barium titanate, silica, silicone resin, acrylic resin, styrene resin, styrene-acrylic resin, melamine resin, benzoguanamine resin, melamine-benzoguanamine resin and the like. If a fluorine-containing silicon compound, an isocyanate silane compound, a modified silicone oil or the like, which are highly reactive with these fine particles, is used as the releasing material, the releasing material is hardened together with pulp fibers, so that a function of fixing fine particles in the substrate is also exhibited.

An aluminum compound, a titanium compound or a zirconium compound can be added to the coating composition for coating the releasing material on the substrate of the image recording medium in an amount such that the releasing effect thereof does not deteriorate. Examples of such compounds include: aluminum isopropylate, aluminum sec-butylate, aluminum tert-butylate, tetraisopropyl titanate, tetra n-butyl titanate, tetraisobutyl titanate, tetra sec-butyl titanate, tetra tert-butyl titanate, tetra n-pentyl titanate, tetraisopentyl titanate, tetra n-hexyl titanate, tetra n-heptyl titanate, tetra n-octyl titanate, tetraisooctyl titanate, tetra n-nonyl titanate, tetramethyl zirconate, tetraethyl zirconate, tetraisopropyl zirconate, tetra n-propyl zirconate, tetra n-butyl zirconate, tetraisobutyl zirconate, tetra tert-butyl zirconate, mono sec-buthoxy aluminum di-isopropylate, ethylacetoacetate aluminum di-isopropylate, di-n-butoxy aluminum monoethylacetoacetate, aluminum di-n-butoxide methylacetoacetate, aluminum di-isobutoxide monomethylacetoacetate, aluminum di-sec-butoxide monoethylacetoacetate, aluminum di-isopropoxide monoethylacetoacetate, aluminum tris-acetyl acetoacetate, aluminum di-isopropoxide monoacetylacetonate, aluminum monoacetylacetonate bis(ethylacetoacetate), aluminum tris-(ethylacetoacetate), cyclic aluminum oxide acylate, di-isopropoxy titan bis(acetylacetonate), di-n-butoxy titan-bis-(acetylacetonate), tetraoctylene glycol titanate, tetrakisacetylacetone zirconium and the like.

Examples of light transmissive plastic films which can be used as a substrate for an OHP film are: an acetate film, a cellulose triacetate film, a nylon film, a polyester film, a polycarbonate film, a polystyrene film, a polyphenylene sulfide film, a polypropylene film, a polyimide film, cellophane and the like. Currently, a polyester film, particularly, a biaxially stretched polyethylene terephthalate film is often used from the comprehensive viewpoint of mechanical, electrical, physical, chemical properties, processability, and the like.

It is preferable to provide the surface of the above mentioned plastic film with releasability, as in the case of the paper substrate. It is preferable to use the previously-described releasing materials as the releasing material for this purpose, although the releasing material in this case as well is not limited to those described previously.

The following generally used methods are used as methods for applying or permeating the solution or the like: a blade coating method, a wire bar coating method, a spray coating method, a dip coating method, a bead coating method, an air-knife coating method, a curtain coating method, a roll coating method and the like.

The coated film may be dried by air drying, but heat drying has an advantage in that the releasability with respect to the image forming material is increased. Although the exact reason is unknown, it is believed that a component which reacts with a substrate is arranged or oriented. Any of well-known methods may be used as the heat drying method, such as the coated image recording medium being inserted in or made to pass through an oven, the coated image recording medium being made to contact a heated roller, or the like.

The image stripping method using the above-described image stripping member comprises the steps of: stripping an image forming material from an image recording medium by making an image stripping member contact the image forming material on the image recording medium and heating the image recording medium, the image stripping member having a surface layer having affinity and releasability with respect to an image recording material; and removing, from the image stripping member, the image forming material which has been transferred to the image stripping member from the image recording medium.

The method can further comprise the step of reducing adhesiveness with respect to the image recording medium and image forming material, before contacting the image stripping member with the image forming material on the image recording medium. In the step of reducing the adhesiveness, it is preferred that the image forming material on the image recording medium is fused. To this end, the image forming material can be heated or exposed to infrared radiation or the like. As an alternative, the image recording medium on which the image forming material is held may be dipped in a solution containing a surfactant or the like. From the viewpoint of maintaining releasability of the image stripping member, the surfactant should not be accumulated on the image stripping member. Therefore, adoption of a method for reducing adhesiveness by means of heating or infrared irradiation is preferable.

Heating of the image forming material can be conducted in the stripping step.

Figure 2:
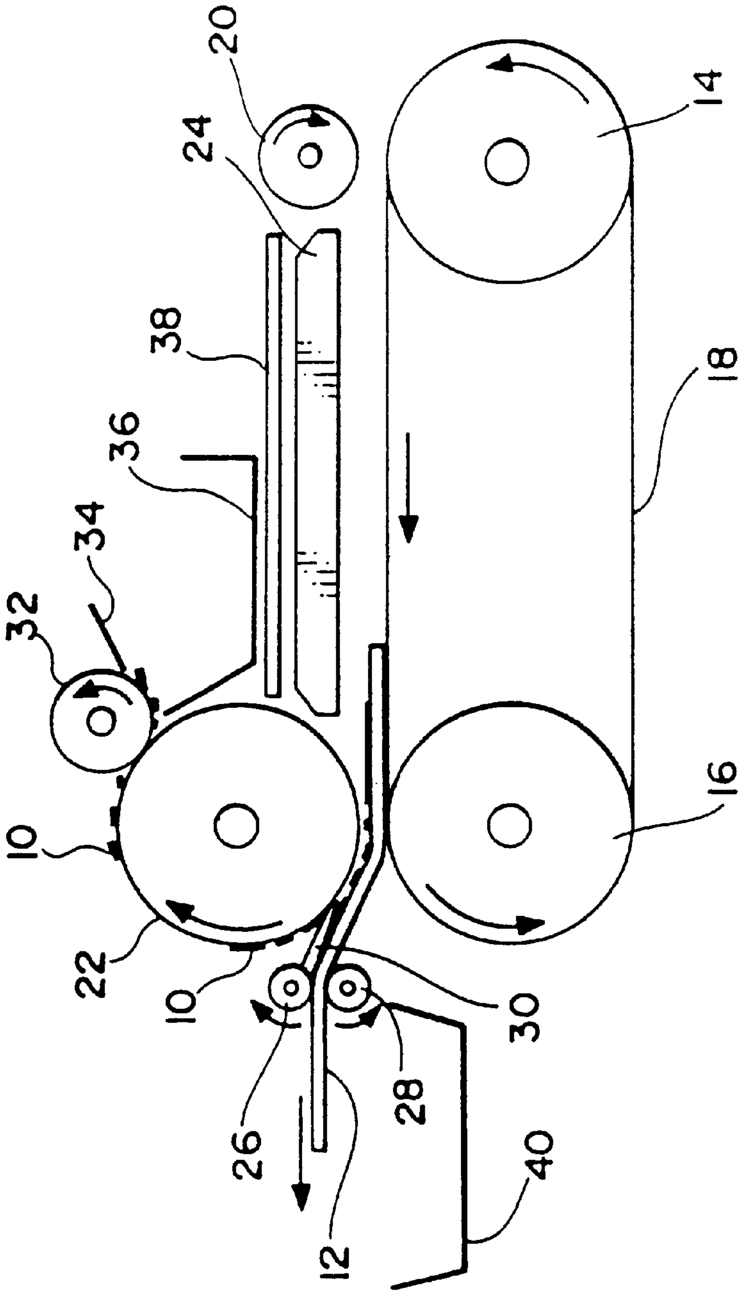
FIG. 2 is an operational view showing a state in which an image forming material is stripped from the image recording medium in the image stripping apparatus of FIG. 1.

An image stripping apparatus according to the first embodiment, to which the above image stripping member and image stripping method are applied, is shown in FIGS. 1 and 2.

The image stripping apparatus of FIGS. 1 and 2 used for stripping an image forming material 10 from an image recording medium 12 comprises a conveying roller 14 and a pressure roller 16, both of which are substantially the same size and disposed horizontally. A conveying belt 18 is trained about the conveying roller 14 and pressure roller 16. A second conveying roller 20 is disposed directly above the first conveying roller 14 so as to be spaced apart from the first conveying roller 14 by a predetermined distance. A stripping roller 22 is disposed directly above the pressure roller 16 so as to be spaced apart from the pressure roller 16 by a predetermined distance. The stripping roller 22 serves as an image stripping member whose surface layer is made of a material having affinity and releasability with respect to an image recording material. When the image recording medium 12 passes a nip section between the pressure roller 16 and the stripping roller 22, pressure is applied to the image recording medium 12. A heater 24 is disposed at a position which is between the second conveying roller 20 and the stripping roller 22 and which is above and along the conveying belt 18.

A pair of conveying rollers 26, 28 each having a small diameter are disposed, one above the other, on the side of the stripping roller 22 opposite the side at which the conveying roller 20 is disposed. A strip finger 30 is disposed between the upper conveying roller 26 and the stripping roller 22, and is used for stripping the image forming material 10 in a fused state from the image recording medium 12. The strip finger 30 is substantially plate-shaped. An end portion of the strip finger 30 at the stripping roller 22 side thereof becomes thinner toward the tip end thereof. This tip end of the strip finger 30 is disposed at a position which is higher than the lowest part of the stripping roller 22 and which is spaced apart from the outer periphery of the stripping roller 22 with slight gap therebetween. The other end of the strip finger 30 is disposed at a position in the vicinity of the nip section between the rollers 26, 28.

On the conveying roller 20 side of the highest part of the stripping roller 22, a cleaning roller 32, which has a surface layer formed by a material having high affinity with the image forming material 10, is disposed so as to contact the stripping roller 22. Moreover, a cleaning blade 34 is disposed on the conveying roller 20 side of the cleaning roller 32. The cleaning blade 34 is plate-shaped, and an end thereof contacts the outer periphery of the cleaning roller 32 along an axial direction thereof. The other end of the cleaning blade 34 is upwardly disposed in an oblique manner.

Under the cleaning blade 34, a recovery box 36 for recovering the image forming material 10 is disposed. A thermal insulator 38 which is plate-shaped is interposed between the recovery box 36 and the heater 24 for intercepting heat from the heater 24.

A recovery tray 40, for recovering the image recording medium 12 from which the image forming material 10 has been removed, is disposed at a position lower than the conveying rollers 26, 28 at the side thereof opposite the stripping roller 22.

In the image stripping apparatus, the first conveying roller 14 and pressure roller 16 are driven to be rotated in a counterclockwise direction at the same circumferential speed. The second conveying roller 20 and the stripping roller 22 are both driven to be rotated in the forward direction relative to the rotational direction of the conveying roller 14 and pressure roller 16, that is, in the clockwise direction. The conveying roller 28 is driven to be rotated in counterclockwise direction, and the conveying roller 26 is driven to be rotated in a forward direction relative to the rotational direction of the conveying roller 28, that is, in a clockwise direction.

Operation of the image stripping apparatus will be described hereinafter.

As shown in FIG. 1, the image recording medium 12 is guided to the nip section between the first and second conveying rollers 14, 20 in a state in which the surface of the image recording medium 12 on which the image forming material 10 is held faces upward. The image recording medium 12 is moved toward the pressure roller 16 by movement of the conveying belt 18 caused by rotation of the conveying rollers 14, 20, the conveying roller 14, and the pressure roller 16. The image forming material 10 on the image recording medium 12 is fused by heat radiated from the heater 24 which is disposed above the conveying belt 18 and heated in advance.

As shown in FIG. 2, the image recording medium 12 is guided to the nip section between the pressure roller 16 and the stripping roller 22 and moved in accordance with the rotation of these rollers, and the stripping roller 22 and the image forming material 10 on the upper surface of the image recording medium 12 contact each other. At this time, since the image forming material 10 is in a fused state and the surface layer of the stripping roller 22 contains a material having high affinity with respect to the image forming material 10, the image forming material 10 adheres to the stripping roller 22, and the image recording medium 12 adheres to the stripping roller 22 with the image forming material 10 being interposed therebetween.

Here, since the image forming material 10 is generally held in at image region other than edge portions of the image recording medium 12 and is not held at the leading end portion of the image recording medium 12 which is a non-image region, the leading end portion does not adhere to the stripping roller 22. For this reason, a gap is formed between the leading end portion of the image recording medium 12 and the outer periphery of the stripping roller 22 as the stripping roller 22 is rotated in the clockwise direction, after the leading end portion of the image recording medium 12 passes the lowest point of the stripping roller 22. The leading end portion of the image recording medium 12 abuts the lower surface of the strip finger 30. The image recording medium 12 is guided along the lower a surface of the strip finger 30 to the nip section between the rollers 26, 28. Since a material having high affinity with respect to the image forming material 10 is contained in the surface layer of the stripping roller 22, the image forming material 10 is left behind on the outer periphery of the stripping roller 22 and stripped from the image recording medium 12 when the image recording medium 12 is separated from the stripping roller 22.

Since a gap is formed between the strip finger 30 and the stripping roller 22, the image forming material 10 transferred to the stripping roller 22 from the image recording medium 12 does not remain at the tip end of the strip finger 30, and as the stripping roller 22 rotates, the image recording material 10 passes through the gap, reaches the nip section between the stripping roller 22 and the cleaning roller 32, and contacts the cleaning roller 32 so as to adhere thereto.

A material having high affinity with respect to the image forming material 10 is contained in the surface layer of the cleaning roller 32, and the material forming the surface layer of the stripping roller 22 has not only affinity but also releaseability with respect to the image recording material. Therefore, the image forming material 10 is transferred to the cleaning roller 32 from the stripping roller 22 as the stripping roller 22 and the cleaning roller 32 rotate. In this way, since the image forming material 10 transferred to the stripping roller 22 is stripped with ease from the stripping roller 22, the stripping roller 22 maintains the same level of releasability as it had at the initial stages.

The image forming material 10 transferred to the cleaning roller 32 reaches the lower surface of the end portion of the cleaning blade 34 in contact with the outer periphery of the cleaning roller 32 by rotation of the cleaning roller 32 in a counterclockwise direction in accordance with the rotation of the stripping roller 22. The image forming material 10 is stripped from the cleaning roller 32 by the cleaning blade 34.

The stripped image forming material 10 falls downward of the cleaning blade 34 to be accumulated in the recovery box 36. Since the recovery box 36 is shielded from heat radiated from the heater 24 by the thermal insulator 38, the image forming material 10 is cooled in the recovery box 36 and solidified, or the image forming material 10 before recovery in the recovery box 36 is prevented from being fused again.

The image recording medium 12 from which the image forming material 10 has been removed is moved in accordance with the rotation of the conveying rollers 26, 28 and is recovered in the recovery tray 40.

In the first embodiment, if there is the concern that the image forming material 10 will solidify before being transferred to the cleaning roller 32, the stripping roller 22 is preferably heated.

Figure 3:
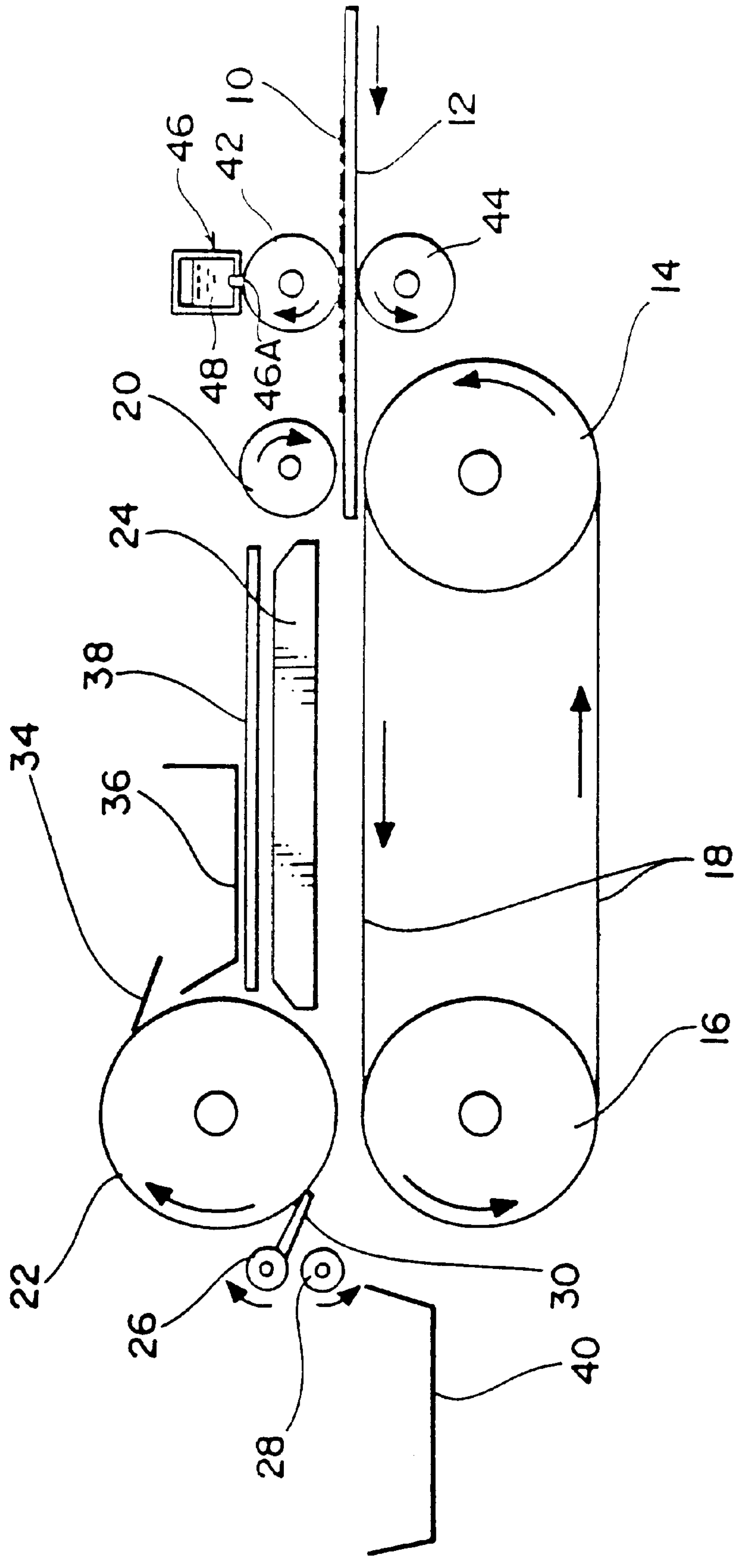
FIG. 3 is a schematic view showing a structure of an image stripping apparatus according to a second embodiment of the present invention.

In FIG. 3, a second embodiment of the image stripping apparatus of the present invention is shown. The same structures as those of the first embodiment are indicated by the same reference numerals, and description thereof is omitted.

An image stripping apparatus according to the second embodiment comprises a pair of rollers 42, 44, which are disposed one above the other at the side of the conveying roller 14 opposite the side at which the stripping roller 22 is disposed, and a tank 46 disposed above an upper roller 42.

The roller 42 is driven to be rotated in the clockwise direction. The tank 46 is in the shape of a box, and a length thereof along a direction parallel to the axial direction of the roller 42 is substantially the same as that of the roller 42. A slit (not shown) is formed in the bottom wall of the tank 46 along a direction parallel to the axial direction of the roller 42. A sponge 46A is placed in the slit, and the lower surface of the sponge 46A contacts the outer periphery of the roller 42. The tank 46 contains a releasing material 48. The image stripping apparatus does not include the cleaning roller 32. An end of the cleaning blade 34 contacts the outer periphery of the stripping roller 22 along the axial direction of the stripping roller 22 at the conveying roller 20 side of the uppermost part of the stripping roller 22. The other end of the cleaning blade 34 is disposed so as to incline downwardly.

In the image stripping apparatus, the releasing material 48 in the tank 46 is transferred to the outer periphery of the roller 42 through the sponge 46A, and then made to adhere to the image forming material 10 held on the image recording medium 12 guided to the nip section between the rollers 42, 44 in accordance with the rotation of the rollers 42, 44. In the image stripping apparatus, the image forming material 10 transferred to the stripping roller 22 from the image recording medium 12 reaches the upper surface of the end portion of the cleaning blade 34 which contacts the outer periphery of the stripping roller 22, and is stripped from the stripping roller 22 by the cleaning blade 34. The stripped image forming material 10 is moved downward along the slope of the cleaning blade 34 to be recovered in the recovery box 36.

It suffices for a roller which makes the releasing material adhere to the image forming material 10 to only be disposed at the side of the image recording medium 12 on which the image forming material 10 is held. Therefore, it is possible to provide a guide plate for guiding the image recording medium 12 to the nip section between the conveying rollers 14, 20 instead of the roller 44 which is omitted and bears no function for the adhesion. In the present embodiment, while the releasing material 48 is made to adhere to only one side of the image recording medium 12, another tank may be provided on the roller 44 side and the releasing material 48 may thereby be made to adhere to both sides of the image recording medium 12.

Figure 4:
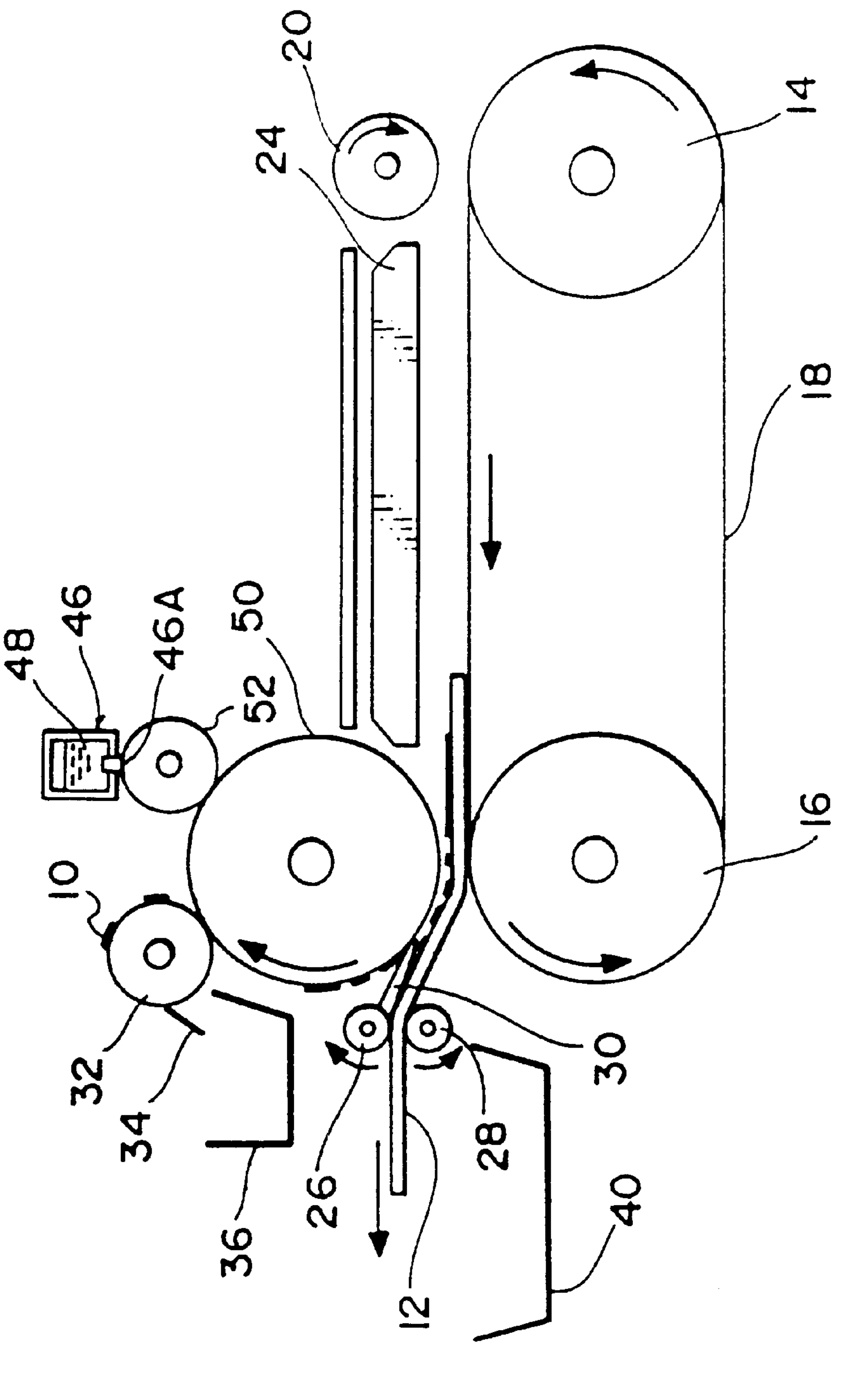
FIG. 4 is a schematic view showing a structure of an image stripping apparatus according to a third embodiment of the present invention.

In FIG. 4, an image stripping apparatus of the present invention according to the third embodiment is shown. The same structures as those of the first and second embodiments are indicated by the same reference numerals, and description thereof is omitted.

Instead of the stripping roller 22 according to the first embodiment, the image stripping apparatus according to the third embodiment comprises a stripping roller 50 which is formed of an aluminum with an anodic oxidation coat and whose surface layer does not contain a material having releasability. Further, the image stripping apparatus in accordance with the third embodiment comprises no insulating material 38. In the image stripping apparatus according to the third embodiment, the cleaning roller 32 is disposed so that it contacts the stripping roller 50 on the side of the uppermost part of the stripping roller 50 opposite the side at which the conveying roller 20 is disposed. The cleaning blade 34 is disposed at the side of the cleaning roller 32 opposite the side at which the conveying roller 20 is disposed, in such a manner that an end of the cleaning blade 34 contacts the outer periphery of the cleaning roller 32 along the axial direction of the cleaning roller 32. The other end of the cleaning blade 34 is inclined downwardly. The recovery box 36 is disposed under the cleaning blade 34. A roller 52 is disposed so that contacts the stripping roller 50 on the conveying roller 20 side of the uppermost portion of the stripping roller 50. The tank 46 is disposed directly above the roller 52 so that the sponge 46A embedded in the bottom wall of the tank 46 contacts the outer periphery of the roller 52.

In this image stripping apparatus, the releasing material 48 is transferred to the outer periphery of the roller 52 via the sponge 46A, then transferred to the outer periphery of the roller 50, so that it is made to adhere to the image forming material 10 held on the image recording medium 12 guided to the nip section between the stripping roller 50 and pressure roller 16.

Since this image stripping apparatus can use an image stripping member whose surface layer does not contain a material having releasability, the apparatus can also be applied to cases where the releasing material cannot homogeneously be dispersed in the surface layer due to its poor compatibility with the material having high affinity with respect to the image forming material 10. In this case, the same effects are achieved as those in the case where an image stripping member containing a material having releasability in the surface layer is used.

The image stripping apparatus described above may be used alone, or may be built into an electrophotographic image forming apparatus or the like. As an example of such a case, FIG. 5 is a schematic view of an image forming and stripping apparatus according to the fourth embodiment.

Figure 5:
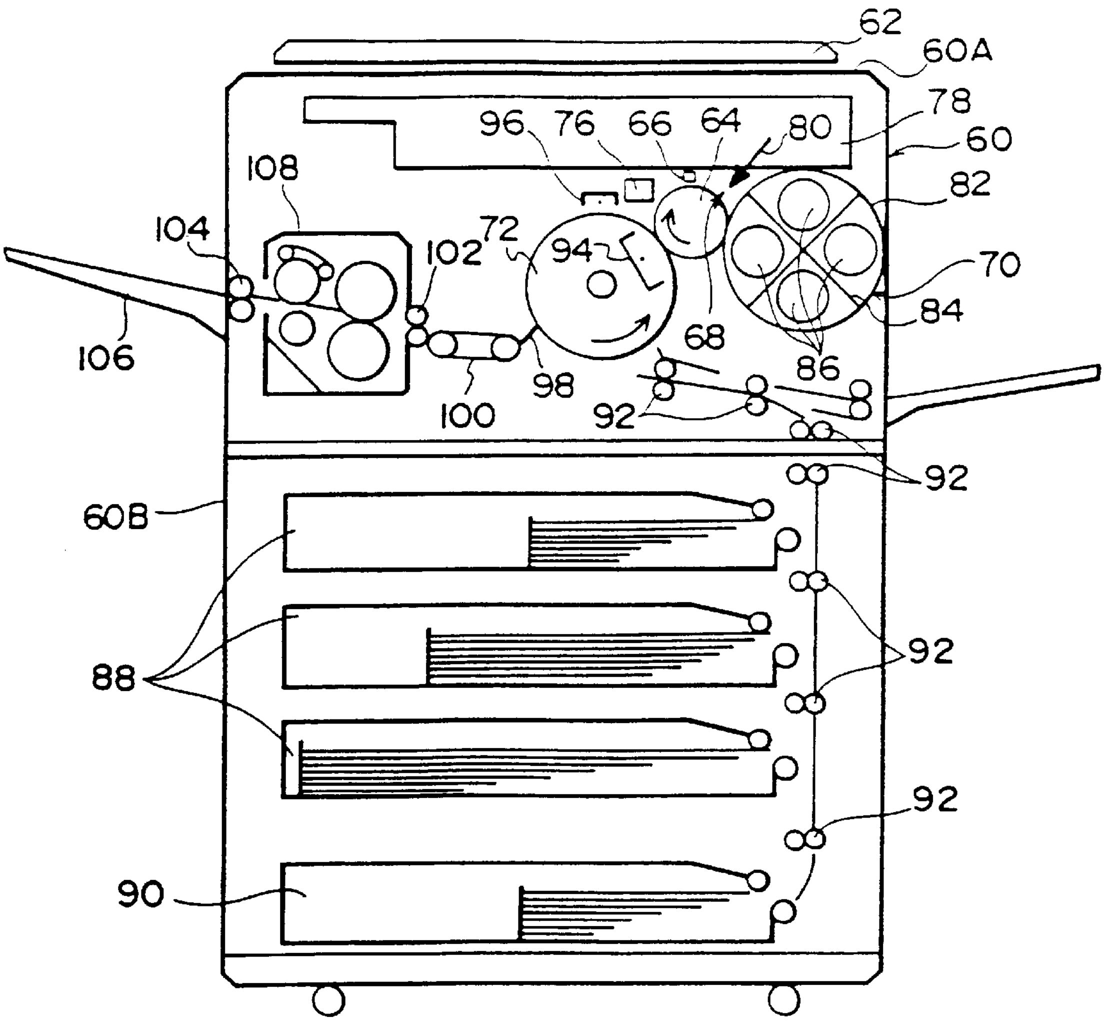
FIG. 5 is a schematic view showing a structure of an image forming and stripping apparatus according to a fourth embodiment of the present invention.

As illustrated in FIG. 5, the image forming and stripping apparatus comprises a substantially box-shaped housing 60 and a cover 62. A rectangular opening is formed in an upper wall 60A of the housing 60. A rectangular, transparent platen glass (not shown) is fit into the opening. The cover 62 is rectangular, is larger than the platen glass, is disposed so as to cover the platen glass, and an end thereof is fixed by a hinge to the upper wall 60A. The cover 62 can thereby be opened or closed. When the cover 62 is closed, the cover covers the platen glass.

A photoreceptor 64 having a cylindrical shape, which is driven to be rotatable in the clockwise direction, is disposed in the housing 60. A charger 66, an exposing section 68, a developing unit 70, a transfer belt 72, and a cleaner 76 are disposed in the vicinity of the photoreceptor 64. The charger 66 is used for charging the photoreceptor 64. The exposing section 68 for forming an electrostatic latent image by exposing the photoreceptor 64 is disposed at a position downstream of the charger 66 in the direction of rotation of the photoreceptor 64. The developing unit 70 for full color development, which forms a visible image of respective colors by adhering the image forming material on the electrostatic latent image on the photoreceptor 64, is disposed at a position downstream of the exposing section 68 in the rotational direction. The transfer belt 72, which is cylindrical and transfers the visualized latent image on the photoreceptor 64 onto the image recording medium, is disposed downstream of the developing unit 70 in the rotational direction. The cleaner 76 for removing residual charge and residual image forming material on the photoreceptor 64 is disposed downstream of the transfer belt 72 in the rotational direction.

An optical system control section 78 is provided in the housing 60. The optical system control section 78 is provided with an image reading section, which forms image data of each color from an original, and one ROS (raster scanning device). A laser beam 80 having a predetermined spot diameter is illuminated toward the exposing section 68 in accordance with the image data of the respective colors which image data is output from the image reading section.

The developing unit 70 comprises a housing 82 in the shape of a cylinder, and four slits (not shown) are formed on the outer peripheral surface of the housing along the axial direction at intervals of 90 degrees. A partition plate 84, having a shape of a cross as viewed along a radial direction of the housing 82, is disposed so as to contact the inner wall of the housing 82 at a substantially central portion between adjacent slits. The inner space of the housing 82 is divided into four equal sections. A developing sleeve 86 having a cylindrical shape is disposed in the vicinity of the slit of each partitioned inner space. In each partitioned inner space, an image forming material feeder and a stirring machine (both not shown) are disposed. Moreover, image forming materials of black, cyan, magenta and yellow are supplied to the partitioned inner spaces, respectively. The developing unit 70 is intermittently driven to be rotated and temporarily stopped at positions where the respective slits are opposed to the photoreceptor 64, such that the electrostatic latent image on the photoreceptor 64 is developed with the image forming materials of the respective colors.

The following members are disposed in the lower part of the housing 60: a first tray 88 containing unused image recording media; a second tray 90 containing image recording media on which image forming materials are held; and a plurality of pairs of rollers 92 for conveying the image recording media from the first tray 88 and the second tray 90 to the transfer belt 72.

The transfer belt 72 is driven to be rotated in the counterclockwise direction. A transfer unit 94, which is used for transferring an image forming material on the image recording medium, is disposed at a position opposing to the photoreceptor 64 and inside the transfer belt 72. A charger 96, which is used to charge the image recording medium and facilitate separation of the image recording medium from the transfer belt 72, is disposed downstream of the transfer unit 94 of the transfer belt 72 in a rotational direction. A finger 98 is disposed such that an end thereof contacts the transfer belt 72 downstream of the charger 96 of the transfer belt 72. A guide plate (not shown) for guiding the image recording medium along the outer periphery of the transfer belt 72 is disposed at the outer periphery of the transfer belt 72.

A conveying belt 100, for conveying an image recording medium separated from the transfer belt 72, is disposed in a vicinity of the finger 98. A pair of rollers 102 is disposed at the side of the conveying belt 100 opposite the finger 98. A slit is formed along a horizontal direction on a side wall 60B of the housing 60. A pair of rollers 104 are disposed in the housing 60 in the vicinity of the slit. A third tray 106 extends upwardly from a lower position than the slit formed in the side wall 60B. A fixing and stripping unit 108 is disposed between the rollers 102, 104.

The image forming and stripping apparatus is controlled by a control section (not shown) having a CPU and a memory. An operation panel (not shown) for switching between fixing and stripping modes is provided on the upper surface of the housing 60.

When a fixing mode is selected, the photoreceptor 64 is charged in a uniform manner, is exposed in accordance with the image data of the respective colors, and a latent image is developed with an image forming material corresponding to image data of one color to form a visible image of the one color. The visible image is transferred onto an image recording medium conveyed by the rollers 92 and the transfer belt 72 from the first tray 88. Residual charge and residual image forming material 10 on the photoreceptor 64 are removed by the cleaner 76. The above mentioned process is repeated for each color so that a multi-color image is formed on the image recording medium. Thereafter, the image recording medium is conveyed to the fixing and stripping unit 108 by way of the transfer belt 100 and the rollers 102, and the multi-color image is fixed on the image recording medium. The image recording medium, on which the multi-color image is fixed, is conveyed to the third tray 106 by the rollers 104.

On the other hand, when a stripping mode is selected, an image recording medium holding an image forming material is conveyed from the second tray 90 to the fixing and stripping unit 108 by way of the rollers 92, the transfer belt 72, the conveying belt 100, and the rollers 102, and the image forming material is stripped from the image recording medium in this unit. The image recording medium from which the image forming material is stripped is further conveyed by the rollers 104 to the third tray 106.

Figure 6:
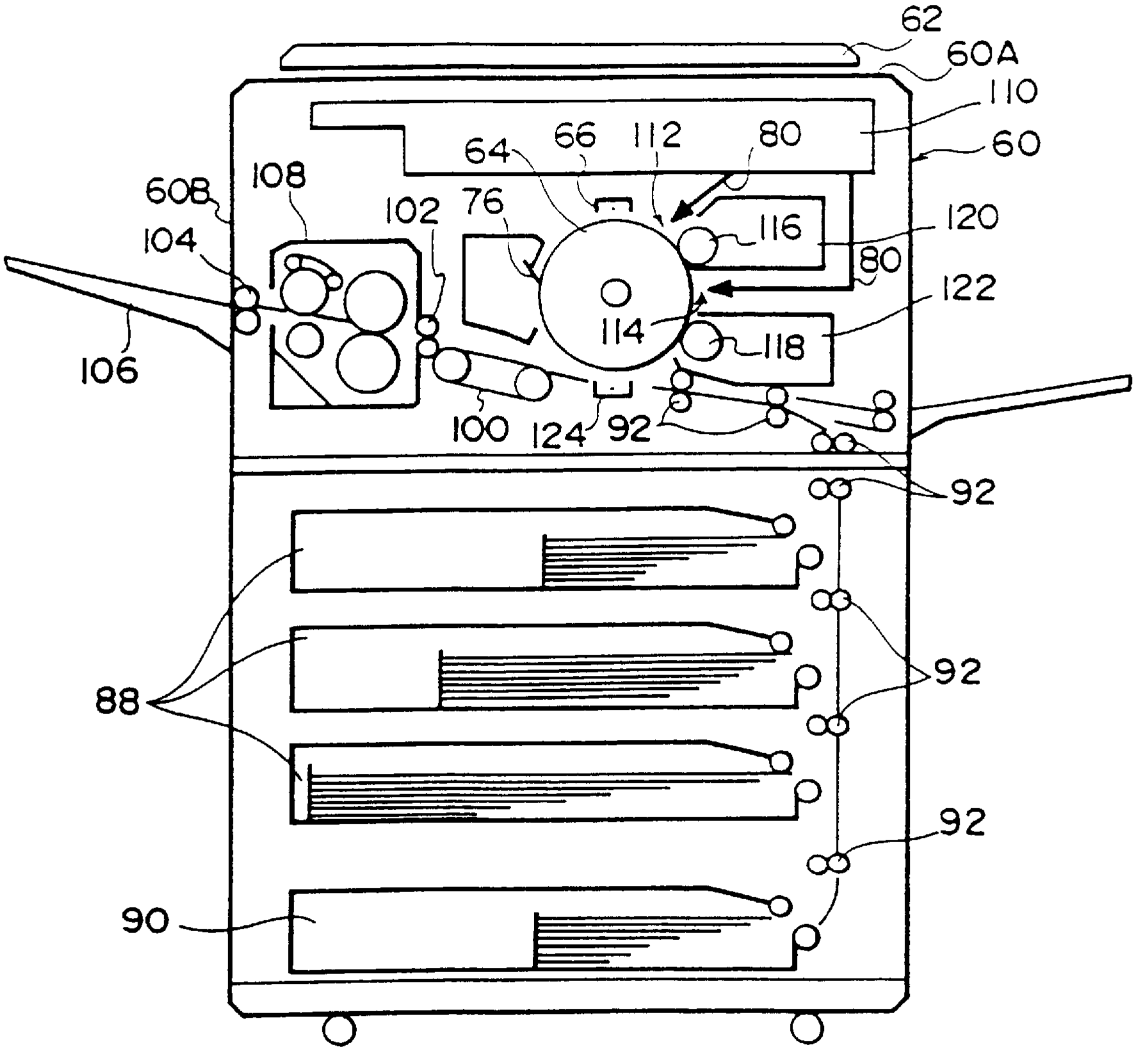
FIG. 6 is a schematic view showing a structure of an image forming and stripping apparatus according to a fifth embodiment of the present invention.

FIG. 6 shows an image forming and stripping apparatus for a monochromatic or two color image. The same structures as those of the fourth embodiment are respectively indicated by the same reference numerals, and descriptions thereof are omitted.

The image forming and stripping apparatus for a monochromatic or two color image according to the fifth embodiment comprises: instead of the optical system control section 78, an optical system control section 110 including an image reading section and two units of ROS for forming image data for each color from an original; instead of the developing unit 709, developing units 120, 122 equipped with developing sleeves 116, 118 which each can develop only one color; and instead of the transfer belt 72, the transfer unit 94 and the charger 96, a transfer unit 124 disposed at a position between the developing unit 122 and the transfer belt 100. Exposure can therefore be conducted at two locations: at an exposing section 112 upstream of the developing unit 120 in the rotational direction, and at an exposing section 114 at a position between the developing units 120, 122.

In the image forming and stripping apparatus for a monochromatic or two-color image, when a fixing mode is selected, the photoreceptor 64 is charged in a uniform manner, is subjected to exposure according to image data, and is developed to form a monochromatic visible image on the photoreceptor 64. When a two-color image is formed, the photoreceptor 64 is further subjected to exposure according to another image data, and is developed to form a two-color visible image on the photoreceptor 64. The visible image is transferred to the image recording medium conveyed from the first tray 88 by the rollers 92. Residual electric charge and residual image forming material 10 on the photoreceptor 64 are removed by the cleaner 76. The transferred image recording medium is conveyed to the fixing and stripping unit 108 by way of the conveying belt 100 and the rollers 102 to fix a monochromatic or two-color image on the image recording medium. The image recording medium on which an image is fixed is conveyed to the third tray 106 by the rollers 104.

On the other hand, when a stripping mode is selected, the image recording medium holding the image forming material is conveyed to the fixing and stripping unit 108 from the second tray 90 by way of the rollers 92, the conveying belt 100 and the rollers 102, and the image forming material is stripped from the image recording medium in this unit. The image recording medium from which the image forming material is stripped is further conveyed to the third tray 106 by the rollers 104.

Figure 7:
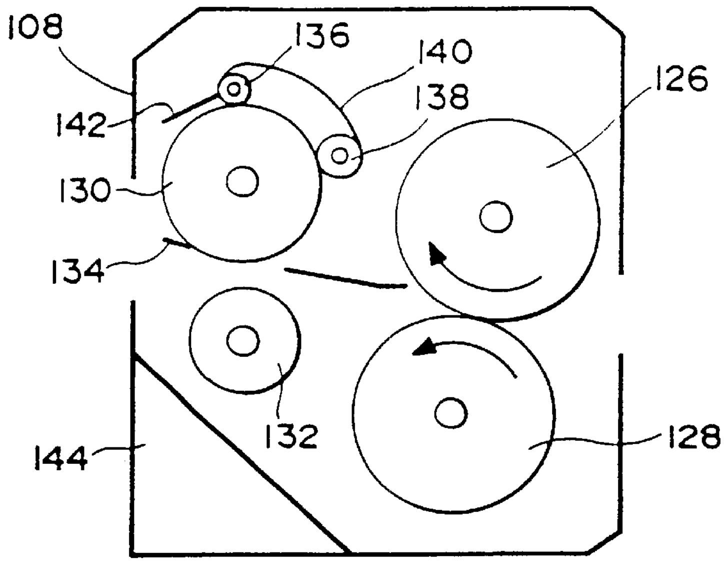
FIG. 7 is a schematic view of a structure of a fixing and stripping unit used in the image forming and stripping apparatus of FIG. 5 or 6, and illustrates a state in which a fixing mode is selected.
Figure 8:
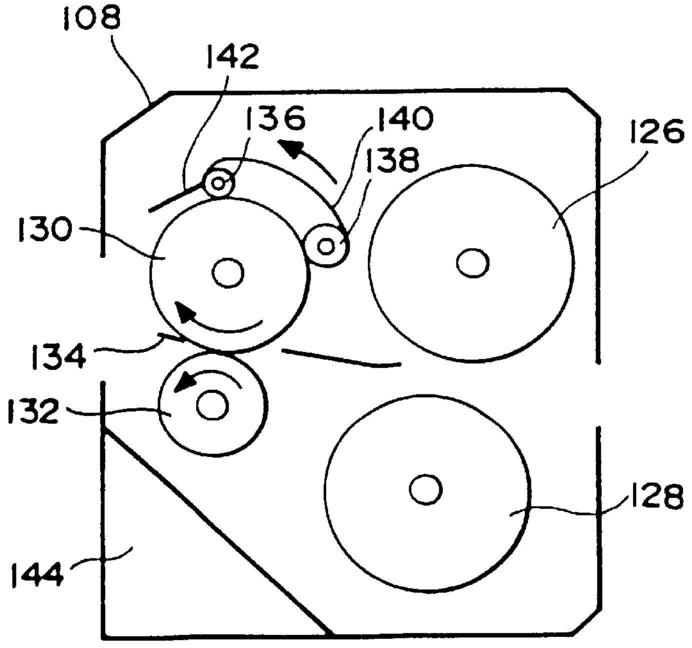
FIG. 8 is an operational view showing a state of a fixing and stripping unit of FIG. 7 at a time when a stripping mode has been selected.

FIGS. 7 and 8 are schematic views of structures of a fixing and stripping unit 108 used for the image forming and stripping material according to the fourth and fifth embodiments. On the roller 102 (FIG. 5 or 6) side of the fixing and stripping unit 108, a heat roller 126 is disposed and a pressure roller 128 is disposed under the heat roller 126. The heat roller 126 and pressure roller 128 are connected to roller moving means (not shown). When a fixing mode is selected, both rollers are set in a state in which they contact each other, as shown in FIG. 7, and on the other hand, when a stripping mode is selected, the rollers are separated from each other, as shown in FIG. 8. On the roller 104 side (see FIG. 5 or 6) of the heat roller 126 is disposed a stripping roller 130 whose surface layer is made of a material having affinity and releasability with respect to the image recording material and which is equipped with a heater (not shown). A pressure roller 132 is disposed under the stripping roller 130. The stripping roller 130 and the pressure roller 132 are connected to roller moving means (not shown). When a stripping mode is selected, both rollers are set in a state in which they contact each other as shown in FIG. 8, and on the other hand, when a fixing mode is selected, the rollers are separated from each other as shown in FIG. 7.

The heat roller 126 and stripping roller 130 are driven to be rotated in the clockwise direction, and the pressure rollers 128, 132 are driven to be rotated in the counterclockwise direction.

On the roller 104 (see FIG. 5 or 6) side of the stripping roller 130, a strip finger 134 is disposed. The strip finger 134 is substantially plate-shaped. An end of the strip finger 134 is located at a position higher than the lowest portion of the stripping roller 130, such that a gap is formed between the end of the strip finger 134 and the outer periphery of the stripping roller 130. The other end of the strip finger 134 is disposed so as to be directed toward the roller 104.

Rollers 136, 138 are respectively disposed in the vicinity of the uppermost portion of the stripping roller 130 at the heat roller 126 side of the uppermost portion, so as to be spaced apart from the outer periphery of the stripping roller 130 by a predetermined distance. A cleaning belt 140, whose surface layer contains a material having high affinity with the image forming material 10, is trained about the rollers 136, 138. A portion of the cleaning belt 140 thereby contacts a portion of the outer periphery of the stripping roller 130 so as to move along with the rotation of the stripping roller 130.

A cleaning blade 142 is disposed at the cleaning belt 140 just before the position where the cleaning belt 140 and the stripping roller 130 contact each other. The cleaning blade 142 is plate-shaped, and an end thereof contacts the outer periphery of the cleaning belt 140 along the axial direction of the rollers 136, 138. The other end of the cleaning blade 142 is disposed so as to be inclined downwardly.

The rollers 136, 138, the strip finger 134 and the cleaning blade 142 are connected to the unillustrated roller moving means to which the stripping roller 130 is connected, so as to move integrally with the stripping roller 130.

A recovery box 144, which is used for recovering image forming materials, is disposed under the cleaning blade 142.

In the fixing and stripping unit 108, when a fixing mode is selected, as shown in FIG. 7, the heat roller 126 heated in advance and the pressure roller 128 are in a state where they contact each other, and the stripping roller 130 and the pressure roller 132 are in a state where they are spaced apart from each other. The image recording medium, on which an image is recorded and which is conveyed from the rollers 102, is guided to the nip section between the heat roller 126 and pressure roller 128 and is heated there under pressure, so that the image forming material is fused. As the heat roller 126 and the pressure roller 128 rotate, the image recording medium passes between the stripping roller 130 and pressure roller 132 which are separated from each other, is guided to the nip section of the rollers 104, and is further conveyed to the third tray 106, so that the image forming material is cooled while being conveyed and is fixed to the image recording medium.

On the other hand, when a stripping mode is selected, as shown in FIG. 8, the heat roller 126 and pressure roller 128 are in a state where they are spaced apart from each other, and the stripping roller 130 heated in advance and the pressure roller 132 are in a state where they contact each other. The image recording medium, which is conveyed from the rollers 102 and on which an image forming material is held, passes between the heat roller 126 and pressure roller 128 which are spaced apart from each other, is guided into the nip section between the stripping roller 130 and pressure roller 132, and is heated under pressure. The image forming material is thereby fused and adheres to the stripping roller 130. The image recording medium is further moved as the stripping roller 130 and pressure roller 132 rotate. The leading end portion of the image recording medium contacts the lower surface of the strip finger 134, and the image recording medium is guided to the nip section of the rollers 104 along the strip finger 134.

Since the surface layer of the stripping roller 130 contains a material having high affinity with the image forming material, when the image recording medium is separated from the stripping roller 130, the image forming material is left behind on the outer periphery of the stripping roller 130 and is stripped from the image recording medium.

As the stripping roller 130 rotates, the image forming material transferred from the image recording medium to the stripping roller 130 passes through the gap between the strip finger 134 and stripping roller 130, reaches the section of contact between the cleaning belt 140 and the stripping roller 130, and comes into contact with the cleaning belt 140 so as to adhere thereto.

The image forming material is moved as the stripping roller 130 and cleaning belt 140 rotate. When the stripping roller 130 and cleaning belt 140 are separated from each other, the image forming material moves from the stripping roller 130 to the cleaning belt 140 which does not contain a material having releasability.

Due to counterclockwise direction rotation of the cleaning belt 140 accompanying rotation of the stripping roller 130, the image forming material which has moved to the cleaning belt 140 reaches the upper surface of the tip end portion of the cleaning blade 142 which contacts the outer periphery of the cleaning belt 140. The image forming material is stripped from the cleaning belt 140 by the cleaning blade 142.

The stripped image forming material moves downwardly along the incline of the cleaning blade 142 so as to be accumulated in the recovery box 144.

In the above-described image forming and stripping apparatus, it is possible to omit the rollers 136, 138 and the cleaning belt 140, such that the cleaning blade 142 directly removes the image forming material from the stripping roller 130.

Figure 9:
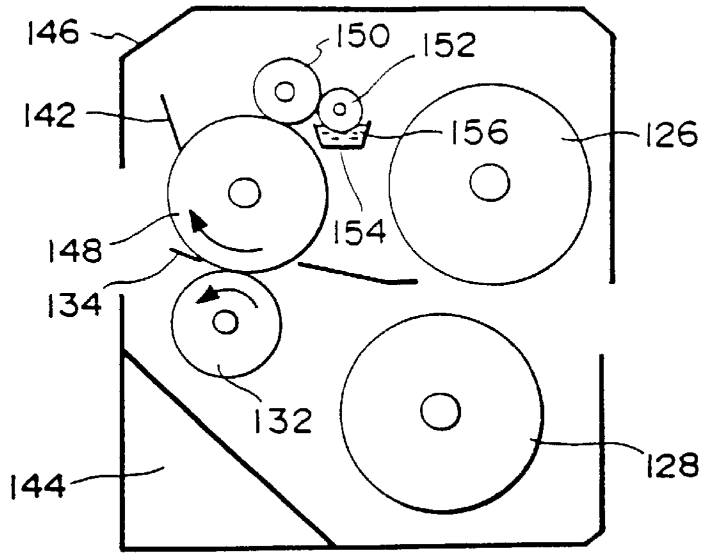
FIG. 9 is a schematic view of a structure of a fixing and stripping unit according to a sixth embodiment and used in the image forming and stripping apparatus of FIG. 5 or 6, and illustrates a state in which a stripping mode has been selected.

FIG. 9 is an example of another embodiment of the fixing and stripping unit. Structures which are the same as those of the fourth embodiment are denoted by the same reference numerals, and description thereof is omitted.

In place of the stripping roller 130 of the fourth embodiment, a fixing and stripping unit 146 of the present sixth embodiment has a stripping roller 148 which is formed of aluminum with an anodic oxidation coat and whose surface layer does not contain a material having releasability. Further, the fixing and stripping unit 146 does not include the rollers 136, 138 and the cleaning belt 140. Moreover, in the fixing and stripping unit 146, the end of the cleaning blade 142 at the rollers 104 side of the outer periphery of the stripping roller 148 contacts the outer periphery of the stripping roller 148 along the axial direction of the stripping roller 148. The other end of the cleaning blade 142 is inclined upwardly. A roller 150 is disposed at the heat roller 126 side of the uppermost portion of the stripping roller 148 so as to contact the stripping roller 148. A roller 152 is disposed upstream of the stripping roller 148 in the rotational direction so as to contact the roller 150.

A tank 154 is disposed beneath the roller 152. The upper side of the tank 154 is open such that the lower portion of the roller 152 is accommodated within the tank 154. A releasing substance 156 is provided in the tank 154 so as to contact the lower portion of the roller 152. The releasing substance 156 is applied to the image forming material on the image recording medium via the roller 152, the roller 150 and the stripping roller 148.

Figure 10:
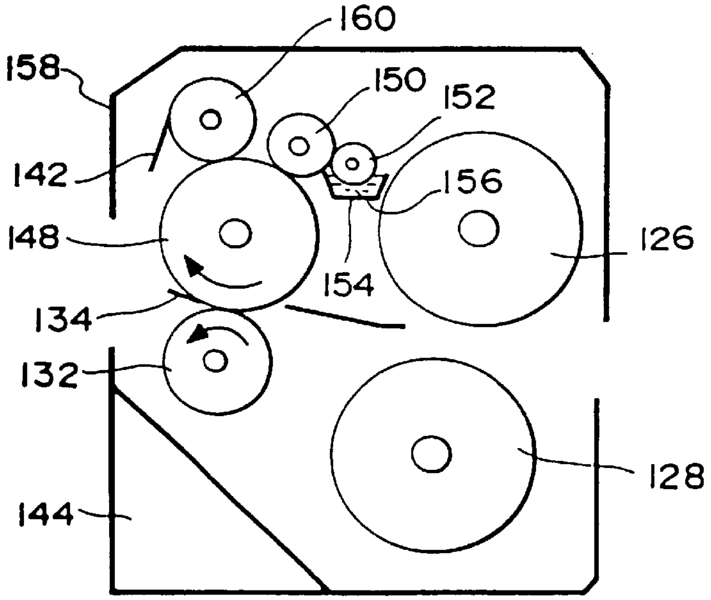
FIG. 10 is a schematic view of a structure of a fixing and stripping unit according to a seventh embodiment and used in the image forming and stripping apparatus of FIG. 5 or 6, and illustrates a state in which a stripping mode is selected.

FIG. 10 illustrates a fixing and peeling unit according to a seventh embodiment. Structures which are the same as those of the sixth embodiment are denoted by the same reference numerals, and description thereof is omitted.

In the fixing and stripping unit 158 relating to the seventh embodiment, a cleaning roller 160 is disposed between the roller 150 and the pressure roller 132 at the outer periphery of the stripping roller 148, so as to contact the stripping roller 148. The end of the cleaning blade 142 at the rollers 104 (see FIGS. 5 and 6) side of the outer periphery of the cleaning roller 160 contacts the outer periphery of the cleaning roller 160 along the axial direction of the cleaning roller 160. The other end of the cleaning blade 142 is inclined downward.

In the fixing and stripping unit 158, the image forming material which has moved onto the stripping roller 148 moves from the stripping roller 148 onto the cleaning roller 160, is stripped from the cleaning roller 160 by the cleaning blade 142, and is recovered in the recovery box 144.

Figure 11:
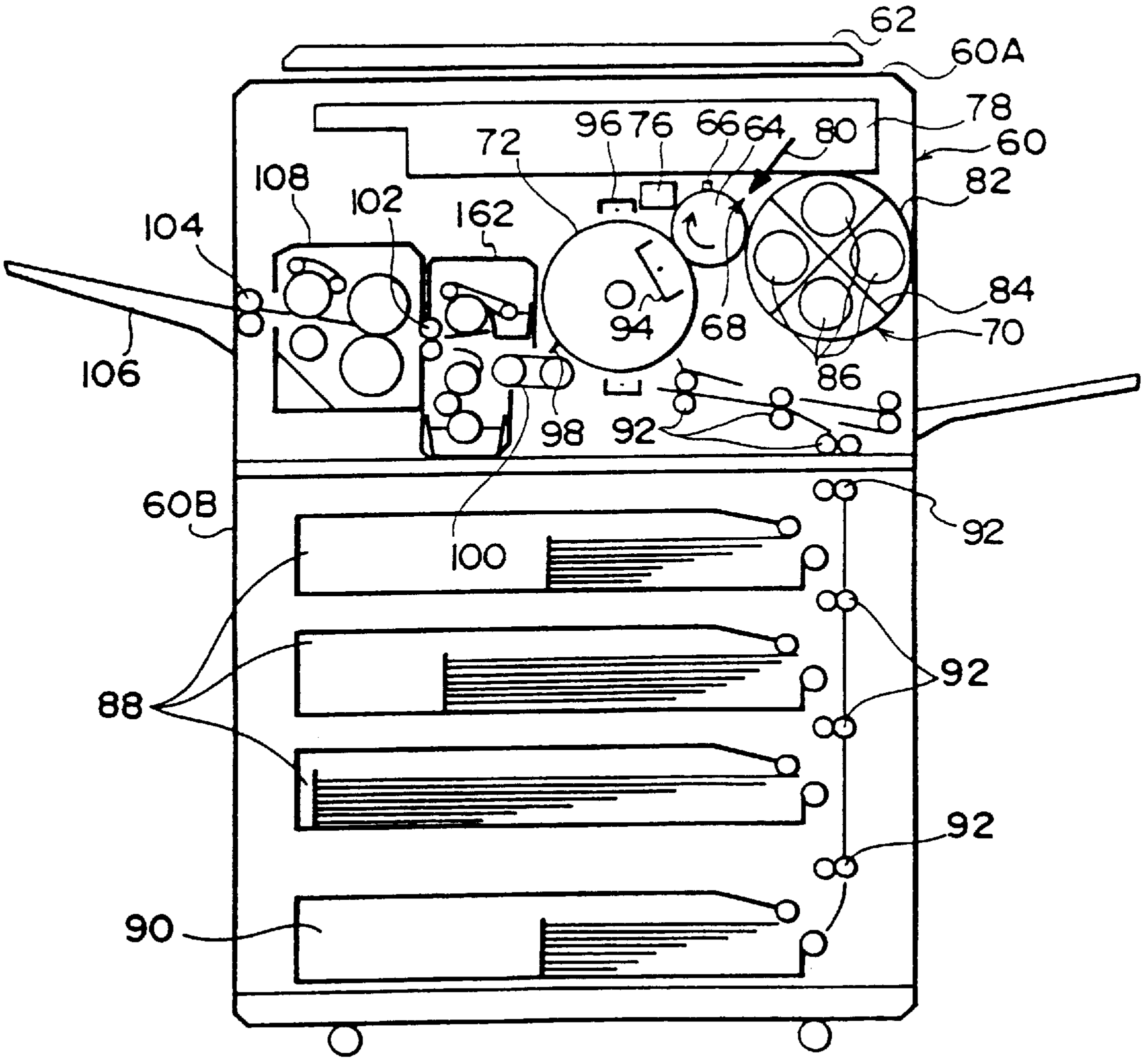
FIG. 11 is a schematic view showing a structure of an image forming and stripping apparatus according to a eighth embodiment in which a stripping liquid applying unit is provided.

FIG. 11 illustrates an image forming and stripping apparatus according to an eighth embodiment. In this apparatus, a stripping liquid applying unit 162 for decreasing the adhesion between the image recording medium and the image forming material is disposed between the rollers 102 and the conveying belt 100. Structures which are the same as those of the fourth through seventh embodiments are denoted by the same reference numerals, and description thereof is omitted.

Figure 12:
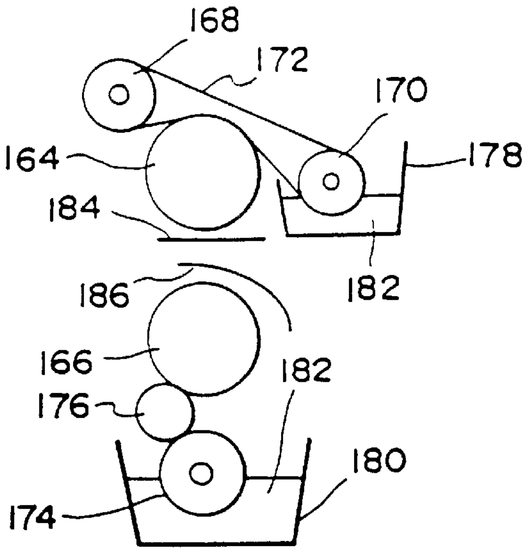
FIG. 12 is a schematic view showing the stripping liquid applying unit used in the image forming and stripping apparatus of FIG. 11, at a time when a fixing mode has been selected.
Figure 13:
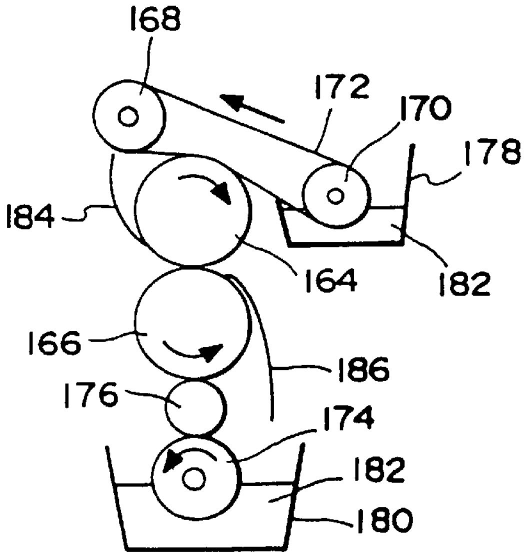
FIG. 13 is an operational view showing a state of the stripping liquid applying unit of FIG. 12, at a time when a stripping mode has been selected.

FIGS. 12 and 13 illustrate the schematic structure of the stripping liquid applying unit 162. The stripping liquid applying unit 162 includes a pair of applying rollers 164, 166 between which is formed a conveying path of the image recording medium conveyed from the conveying belt 100. The applying rollers 164, 166 are connected to an unillustrated roller moving means. When the fixing mode is selected, as illustrated in FIG. 12, the rollers are disposed in a state of being separated from each other. When the stripping mode is selected, as illustrated in FIG. 13, the rollers are disposed in a state of contacting each other. The applying rollers 164, 166 are driven to rotate such that the upper applying roller 164 rotates clockwise while the lower applying roller 166 rotates counterclockwise.

A roller 168 is disposed in a vicinity of the outer periphery of the applying roller 164. A roller 170 is disposed at the side of the applying roller 164 opposite the side at which the roller 168 is disposed, and is provided at a lower position than the roller 168. A solution supplying belt 172 formed by an elastic member is trained about the rollers 168, 170. A roller 174, which is driven to rotate in the counterclockwise direction, is disposed directly beneath the lower applying roller 166 so as to be spaced apart from the lower applying roller 166 by a predetermined distance.

A moving roller 176 is provided between the applying roller 166 and the roller 174. The moving roller 176 is connected to an unillustrated roller moving means. When the fixing mode is selected, as illustrated in FIG. 12, the moving roller 176 is disposed obliquely below the applying roller 166. When the stripping mode is selected, as illustrated in FIG. 13, the moving roller 176 is disposed between the applying roller 166 and the roller 174 such that the applying roller 166, the moving roller 176, and the roller 174 are disposed on the same line, and the moving roller 176 transmits the rotation of the applying roller 166 to the roller 174.

A tank 178 is provided beneath the roller 170, and a tank 180 is provided beneath the roller 174. The upper sides of the tanks 178, 180 are open, and the lower portions of the rollers 170, 174 are accommodated within the tanks 178, 180, respectively. Stripping liquid 182 is disposed within the tanks 178, 180.

The stripping liquid applying unit 162 is provided with a pair of partitioning plates 184, 186. The partitioning plates 184, 186 are connected to an unillustrated partitioning plate moving means. In this way, when the fixing mode is selected, as illustrated in FIG. 12, the partitioning plate 184 is disposed directly beneath the applying roller 164. When the stripping mode is selected, as illustrated in FIG. 13, the partitioning plate 184 is disposed at the rollers 102 (see FIG. 11) side of the applying roller 164. Further, when the fixing mode is selected, the partitioning plate 186 is disposed between the applying roller 166 and the partitioning plate 184 as illustrated in FIG. 12. When the stripping mode is selected, the partitioning plate 186 is disposed at the conveying belt 100 (see FIG. 11) side of the applying roller 166 as illustrated in FIG. 13.

At the stripping liquid applying unit 162, when the fixing mode is selected, as illustrated in FIG. 12, the applying rollers 164, 166 are set in a state in which they are separated from one another. The partitioning plates 184, 186 are disposed between the applying rollers 164, 166, and the moving roller 176 is disposed obliquely below the applying roller 166. The image recording medium, on which an image has been transferred and which is conveyed from the conveying belt 100, passes between the partitioning plates 184, 186, and is conveyed to the rollers 102.

On the other hand, when the stripping mode is selected, as illustrated in FIG. 13, the applying rollers 164, 166 are disposed in a state of contacting one another. The partitioning plate 184 is disposed at the rollers 102 side of the applying roller 164, and the partitioning plate 186 is disposed at the conveying belt 100 side of the applying roller 166. The moving roller 176 is disposed directly beneath the applying roller 166. The image recording medium, on which the image forming material is held and which is conveyed from the conveying belt 100, is guided to the nip portion of the applying rollers 164, 166. Here, the stripping liquid 182 in the tank 178 is applied to the applying roller 164 via the solution supplying belt 172 which moves as the roller 168 rotates. The stripping liquid 182 within the tank 180 is applied to the applying roller 166 via the roller 174 and the moving roller 176. The stripping liquid 182 is applied to both surfaces of the image recording medium from the applying rollers 164, 166. Then, the image recording medium is conveyed to the rollers 102 as the applying rollers 164, 166 rotate.

In the eighth embodiment, the stripping liquid is applied to both surfaces of the image recording medium. However, the rollers 168, 170, the solution supplying belt 172, and the tank 178 may be omitted, or the roller 174, the moving roller 176 and the tank 180 may be omitted.

As described above, in the present invention, a means for switching between a fixing mode and a stripping mode is provided in an ordinary image forming apparatus. By merely changing an ordinary fixing unit into the above-described fixing and stripping unit or by merely adding the stripping liquid applying unit, a device in which both copying and reproduction are possible can be manufactured, and reproduction of an image recording medium at the office or at home is made possible. Further, a large increase in cost associated with reproduction by use of a member for both copying and reproduction is prevented, and no great amount of space is required.

It is preferable that the releasing substance in the above-described embodiments can easily form a uniform thin film. In this regard, oil materials are optimal. Further, a heating means for fusing the releasing substance may be provided, and a hard wax or the like may be used as the releasing substance.

In the above-described embodiments, a (donor) roller or a belt is used for supplying the releasing substance and the stripping liquid. However, another supplying method such as dripping the solution, a blade, a wiper bar, a brush, spraying, or the like may be used. In a case in which the image recording medium is paper, the supplied amount of the releasing substance which is ultimately applied to the surface of the image recording medium is, for one sheet of A4 size paper, preferably 1 mg to 50 mg, and more preferably 2 mg to 20 mg, although it depends on the type of paper. If the supplied amount is less than 1 mg, the image recording medium is strongly adhered to the image stripping member in a winding manner, and the image forming material transferred to the image stripping member cannot be stripped from the image stripping member. If the supplied amount exceeds 50 mg, the image forming material cannot be stripped and removed from the image recording medium because the releasability is strong, and a sticky sensation on the surface of the image recording medium is caused due to the releasing substance.

Water, surfactant-containing aqueous solutions, various types of solvents, and the like can be used as the stripping liquid. Further, in a case in which an ordinary fixing unit not having a stripping function is used, the releasing substance may be applied instead of the stripping liquid at the stripping liquid applying unit 162. In this case, it is possible to apply the releasing substance to only the image recording surface side of the image recording medium, or to apply the releasing substance to both surfaces of the image recording medium.

It is preferable to apply the present invention to an image forming apparatus in accordance with an electrophotographic method as described above. However, the image stripping apparatus and image stripping method of the present invention may be applied to an image forming apparatus using a method other than an electrophotographic method. Further, the image stripping apparatus and the image stripping method of the present invention may be applied not only to multi-color image formation, but also to image forming apparatuses used exclusively for monochromatic images as well.

EXAMPLES

Hereinafter, the present invention will be described by way of Examples in a concrete manner. It should be understood, however, that the present invention is not limited to the scope of the description of these Examples. In the following description, the term "parts by weight" is simply expressed as "parts".

Example 1

Synthesis of Resin (1)

The following starting compounds were placed in a 2 liter 4-necked glass flask at which were set a stirring rod, a condenser, an inlet pipe for nitrogen gas and a thermometer, and the flask was placed in a mantle heater.

| | |
|---|---|
| polyoxyethylene (2, 2)-2, 2-bis(4-hydroxyphenyl) propane | 410 parts |
| polyoxypropylene (2, 2)-2, 2-bis(4-hydroxyphenyl) propane | 340 parts |
| terephthalic acid | 380 parts |

After the interior of reaction vessel was replaced with nitrogen gas. 1.0 part of dibutyl tin oxide was added to the mixture. A reaction took place under normal pressure at a temperature of about 150° C. for the first half and at 220° C. under reduced pressure for the second half, while the mixture was heated in a nitrogen steam by the mantle heater. The degree of polymerization was traced by the softening point in accordance with ASTM E28-51T, and when the softening point reached 120° C., the reaction was terminated, and the resultant substance was cooled to room temperature to obtain the resin (1). Tg of the obtained resin (1) was 57° C.

Preparation of Stripping Roller

Sixty parts of the resin (1) as the affinitive material was added to 400 parts of ethyl acetate, and the mixture was stirred to dissolve. Forty parts of thermoplastic silicone resin powder (trade name "XR39-B1676" manufactured by Toshiba Silicone Co.) as the releasing material was added to 100 parts of ethyl acetate, and the mixture was stirred to dissolve. These two solutions were further mixed with each other while each solution was stirred to obtain a coating liquid. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller to which the coating liquid was applied was subjected to a heat treatment at 115° C. for 15 min, so that a stripping roller having a surface layer of 25 μm thickness thereon was obtained.

Evaluation of Stripping Roller

The thus obtained stripping roller was installed in an image stripping apparatus as a stripping roller, as shown in FIG. 1. An aluminum roller whose surface was treated by an anodic oxidation treatment was used as the cleaning roller. A metal cleaning blade was disposed in such a manner that an end of the cleaning blade contacted the outer periphery of the aluminum roller. A heater was heated in advance to 100° C. A black and white image and a color image, each comprising a character and a solid image, were fixed on a 100 μm thick biaxially stretched PET film, serving as the image recording medium, by use of a color copier "A color 935" manufactured by Fuji Xerox Co.

When the biaxially stretched PET film was inserted into the above mentioned image stripping apparatus, the film was discharged without adhering to the stripping roller in a winding manner. Toner was cleanly removed from the surface of the discharged film. The above mentioned steps were repeated using the same biaxially stretched PET film ten times. Some marks formed by the rubber rollers or the like used in the image stripping apparatus were observed on the backside the film. However, by repeating these steps, the biaxially stretched PET film could be reproduced without any problems and without the toner fixability and light transmissivity deteriorating from their original levels.

Example 2

Preparation of Stripping Roller and Evaluation Thereof

Seven hundred fifty parts of a silicone adhesive (trade name "TSR1520A" manufactured by Toshiba Silicone Co.) as the affinitive material and 7.5 parts of a crosslinking agent thereof (trade name "TSR1520B" manufactured by Toshiba Silicone Co.) were added to 1030 parts of toluene, and mixed together by stirring. Two hundred and twenty parts of a thermoplastic silicone resin powder (trade name "XR39-B1676" manufactured by Toshiba Silicone Co.) serving as the releasing material was added to the mixture and dissolved therein to obtain a coating liquid. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller to which the coating liquid was applied was heated at 120° C. for 15 min, and a stripping roller having the surface layer of 30 μm in thickness was thereby obtained.

The thus obtained stripping roller was installed in the image stripping apparatus used in Example 1. The performance was evaluated in the same was as in Example 1, and similar results to those of Example 1 were obtained.

Comparative Example 1

A roller was prepared in the same way as in Example 1 except that the material forming the surface layer did not contain a releasing material. The roller was installed in the image stripping apparatus used in Example 1. When reproduction of a biaxially stretched PET film was tested under the same conditions as in Example 1, the film was wound around the roller so as to strongly adhere thereto, such that the film could not be reused. Moreover, the roller also could not be used again.

Example 3

The roller prepared in Comparative Example 1 was installed in the image stripping apparatus shown in FIG. 4. An aluminum roller, whose surface was treated by an anodic oxidation treatment, was used as the cleaning roller. A silicone oil (trade name "KF968" manufactured by Shin-Etsu Chemical Industry Co.) was used as the releasing material, and a small amount of the silicone oil was applied on the stripping roller. Similar results to those in Example 1 were obtained when the performance was evaluated in the same way as in Example 1.

Comparative Example 2

Reproduction of a biaxially stretched PET film was tested in the same way as in Example 2 except that silicone oil, which was the releasing material, was not applied to the surface of the stripping roller. Similar results to those in Comparative Example 1 were obtained.

Example 4

Synthesis of Resin (2)

The following starting compounds were reacted, in accordance with a method similar to that used for resin (1) until the softening point reached 115° C., and the resin (2) was obtained. Tg of the obtained resin (2) was 59° C.

| | |
|---|---|
| polyoxyethylene (2, 2)-2, 2-bis(4-hydroxyphenyl) propane | 380 parts |
| cyclohexane di-methanol | 142 parts |
| terephthalic acid | 380 parts |

Preparation of Stripping Roller and Evaluation Thereof

The surface of an aluminum roller having a diameter of 40 mm and a thickness of 3 mm was subjected to an anodic oxidation treatment. A plurality of holes, each having a bottom and a depth of approximately 25 μm, were formed in a uniform distribution over the entire surface of the roller. The holes were filled and sealed with the resin (2), which was the affinitive material, so that a stripping roller was obtained. The obtained stripping roller was installed in the apparatus shown in FIG. 3. A silicone oil (trade name "KF54" manufactured by Shin-Etsu Chemical Industry Co.) was used as the releasing material, and a small amount thereof was applied on a biaxially stretched PET film which was the image recording medium. Similar results as those in Example 1 were obtained when the performance was evaluated in the same way as in Example 1.

Example 5

The surface of an aluminum roller having a diameter of 40 mm and a thickness of 3 mm was treated by an anodic oxidation treatment. A plurality of holes, each having a bottom and a depth of approximately 20 μm, were formed in a uniform distribution over the entire surface of the roller. A mixture of 220 parts of a thermoplastic silicone resin powder (trade name "XR39-B1676" manufactured by Toshiba Silicone Co.), which was the releasing material, and a silicone adhesive agent (trade name "TSR1511" made by Toshiba Silicone Co.), which was the affinitive material, at a weight ratio of 5:95 was used for sealing the holes on the surface of the roller, and the stripping roller was obtained. The obtained stripping roller was installed in the apparatus shown in FIG. 3. A silicone oil (trade name "KF54" made by Shin-Etsu Chemical Industry Co.) was used as the releasing material, and a small amount of the silicone oil was applied on a biaxially stretched PET film which was an image recording medium. Similar results as those in Example 1 were obtained when the performance was evaluated in the same way as in Example 1.

Example 6

Five hundred parts of a silicone adhesive agent (trade name "TSR1510A" manufactured by Toshiba Silicone Co.) as an affinitive material and 5.0 parts of a crosslinking agent thereof (trade name "TSR1510B" manufactured by Toshiba Silicone Co.) were added to 1000 parts of toluene, and mixed together by stirring. Then, 150 parts of the same polyester resin as the resin of the toner to be used (a toner for the color copier "A color 935") and 50 parts of a silicone oil (trade name "TSF451" manufactured by Toshiba Silicone Co.) as a releasing material were further added, and the mixture was again mixed by stirring to obtain a coating liquid. The coating liquid was applied by dipping a roller which was prepared in such a manner that a silicone rubber layer of 1.0 mm was provided on the peripheral surface of an aluminum substrate pipe of 40 mm in diameter and 2 mm in thickness. The roller to which the coating liquid was applied was heated at 120° C. for 15 min, and a stripping roller having a surface layer of 25 μm in thickness was thereby obtained. The thus obtained stripping roller was installed in the image stripping apparatus used in Example 1. The performance was evaluated in the same way as in Example 1, and similar results to those of Example 1 were obtained.

Example 7

Synthesis of Resin (3)

The following starting compounds were reacted, in accordance with a method similar to that used for resin (1), until the softening point reached 120° C., and resin (3) was obtained. Tg of the obtained resin (3) was 57° C.

| | |
|---|---|
| polyoxyethylene (2, 2)-2, 2-bis(4-hydroxyphenyl) propane | 345 parts |
| fumaric acid | 120 parts |

Preparation of Stripping Roller and Evaluation Thereof

Sixty parts of the resin (3) as the affinitive material was added to 600 parts of methylene chloride, and the mixture was stirred to dissolve. Another mixture was prepared by adding 25 parts of a solution silicone rubber (trade name "YSR3022" manufactured by Toshiba Silicone Co.) as a releasing agent and 1 part of a curing catalyst thereof (trade name "YC6843" manufactured by Toshiba Silicone Co.) to toluene, and the mixture was stirred to dissolve. Both solutions were mixed together by stirring to obtain a coating liquid. The coating liquid was applied by dipping a roller which was prepared in such a manner that a silicone rubber layer of 0.6 mm was provided on the peripheral surface of an aluminum substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 8

Seven hundred and fifty parts of a silicone adhesive agent (trade name "TSR1515A" manufactured by Toshiba Silicone Co.) as an affinitive material and 7.5 parts of a crosslinking agent therefor (trade name "TSR1515B" manufactured by Toshiba Silicone Co.) were added to 950 parts of toluene and mixed by stirring. Then, 250 parts of a solution silicone rubber (trade name "YSR3022" manufactured by Toshiba Silicone Co.) and 10 parts of a curing catalyst therefor (trade name "YS6843" manufactured by Toshiba Silicone Co.) were further added, and the resultant mixture was mixed and stirred to obtain a coating liquid. The coating liquid was applied by dipping a roller which was prepared in such a manner that a silicone rubber layer of 2.0 mm was provided on the peripheral surface of a stainless steel substrate pipe of 40 mm in diameter and 2 mm in thickness. The roller to which the coating liquid was applied was heated at 120° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 9

Sixty parts of resin (2) as the affinitive material was added to 300 parts of ethyl acetate, and the mixture was stirred and dissolved. Another mixture was prepared by adding 2 parts of a paraffin wax (trade name "HNP-0190" manufactured by Nihon Seiro Co.) to 100 parts of cyclohexane, and the mixture was stirred and dispersed. Both solutions were mixed together and stirred to obtain a coating liquid. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 25 μm in thickness was thereby obtained. The thus obtained stripping roller was installed in the image stripping apparatus used in Example 1. The performance was evaluated in the same way as in Example 1, and similar results to those of Example 1 were obtained.

Example 10

Eighty parts of resin (3) as the affinitive material was added to 300 parts of methylethyl ketone, and the mixture was stirred to dissolve. Another mixture was prepared by adding 1 part of fine particles of ethylene tetrafluoride (trade name "Lubron L-2" manufactured by Daikin Industry Co.) as a releasing material to 79 parts of cyclohexanone, and the mixture was stirred to disperse. Both solutions were mixed together by stirring to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 11

Synthesis of Resin (4)

The following starting compounds were reacted, in accordance with a method similar to that used to obtain resin (1), until the softening point reached 105° C., and resin (4) was obtained. Tg of the obtained resin (4) was 57° C.

| | |
|---|---|
| polyoxyethylene (2, 2)-2, 2-bis(4-hydrophenyl) propane | 410 parts |
| polyoxypropylene (2, 2)-2, 2-bis(4-hydroxyphenyl) propane | 340 parts |
| terephthalic acid | 215 parts |
| n-dodecenylsuccinic acid | 280 parts |

Preparation of Stripping Roller and Evaluation Thereof

Eighty parts of resin (4), which served as a resin containing a component imparting releasability, was dissolved in 420 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 12

Synthesis of a Resin (5)

The following starting compounds were reacted in the same way as that in which resin (1) was obtained until the softening point reached 115° C., and resin (5) was obtained. Tg of the obtained resin (5) was 62° C.

| | |
|---|---|
| polyoxyethylene (2, 2)-2, 2-bis(4-hydroxyphenyl) propane | 410 parts |
| polyoxypropylene (2, 2)-2, 2-bis(4-hydroxyphenyl) propane | 340 parts |
| terephthalic acid | 300 parts |
| isooctenylsuccinic acid | 130 parts |

Preparation of Stripping Roller and Evaluation Thereof

Eighty parts of the resin (5), serving as a resin containing a component imparting releasability, was dissolved in 420 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 13

Synthesis of Resin (6)

The following starting compounds were reacted in the same way as that in which resin (1) was obtained until the softening point reached 110° C., and the resin (6) was obtained. Tg of the obtained resin (6) was 57° C.

| | |
|---|---|
| polyoxyethylene (2, 2)-2, 2-bis(4-hydroxyphenyl) propane | 725 parts |
| terephthalic acid | 280 parts |
| n-dodecenylsuccinic acid | 170 parts |

Preparation of Stripping Roller and Evaluation Thereof

Eighty parts of the resin (6), as a resin containing a component imparting releasability, was dissolved in 420 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller on which the coating layer was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 14

Synthesis of Resin (7)

The following starting compounds were reacted in the same way as that in which resin (1) was obtained until the softening point reached 115° C., and the resin (7) was obtained. Tg of the obtained resin (7) was 62° C.

| | |
|---|---|
| polyoxyethylene (2, 2)-2, 2-bis(4-hydroxyphenyl) propane | 585 parts |
| terephthalic acid | 165 parts |
| n-dodecenylsuccinic anhydride | 150 parts |

Preparation of Stripping Roller and Evaluation Thereof

Eighty parts of resin (7), as a resin containing a component imparting releasability, was dissolved in 420 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller on which the coating liquid was applied was heated at 115° C. for 15 min, and a stripping roller having a surface layer of 20 μm in thickness was thereby obtained. The thus obtained stripping roller was installed in the image stripping apparatus used in Example 1. The performance was evaluated in the same way as in Example 1, and similar results to those of Example 1 were obtained.

Example 15

Sheets of coated paper (trade name "J Coat" produced by Fuji Xerox Co.) were loaded in a notebook-type word processor SLALA (trade name "FW-U1N10" made by Panasonic Co.) containing a thermal transfer printer, and an image was fixed with a thermally-fusible ink. Reproduction of the coated paper was tested by use of the same apparatus and method as those used in Example 1. The coated paper was discharged form the image stripping apparatus without adhering to the stripping roller in a winding manner. The image on the coated paper was stripped therefrom so as to be cleanly removed to the extent that characters could not be recognized unless the paper was carefully observed. Formation of an image and reproduction of the coated paper were further repeated ten times, and even thereafter, the coated paper was clean to the extent that no problems were presented to actual use thereof, although it was slightly dirtied.

Example 16

Evaluation of the reproducibility of coated paper was conducted in the same way as in Example 15 with the coated paper used in Example 15 and the image stripping apparatus used in Example 2. Similar results to those of Example 15 were obtained.

Example 17

Evaluation of the reproducibility of coated paper was conducted in the same way as in Example 15 with the coated paper used in Example 15 and the image stripping apparatus used in Example 5. Similar results to those of Example 15 were obtained.

Example 18

Evaluation of the reproducibility of coated paper was conducted in the same way as in Example 15 with the coated paper used in Example 15 and the image stripping apparatus used in Example 7. Similar results to those of Example 15 were obtained.

Example 19

Evaluation of the reproducibility of coated paper was conducted in the same way as in Example 15 with the coated paper used in Example 15 and the image stripping apparatus used in Example 9. Similar results to those of Example 15 were obtained.

Example 20

Evaluation of the reproducibility of coated paper was conducted in the same way as in Example 15 with the coated paper used in Example 15 and the image stripping apparatus used in Example 10. Similar results to those of Example 15 were obtained.

Comparative Example 3

Reproduction of the coated paper, on which an image was formed and which was used in Example 15, was tested using the image stripping apparatus used in Comparative Example 1. The coated paper adhered to the stripping roller in an winding manner so strongly that it could not be separated therefrom, and thus reproduction of the coated paper was impossible. In addition, the stripping roller could not be used thereafter.

Example 21

A fixing unit of a color copier (trade name "A color 630" made by Fuji Xerox Co.) was replaced with the fixing and stripping unit shown in FIG. 7. A roller, which was formed by providing a surface layer of about 25 μm formed by the solution of the composition used in Example 1 on the silicone rubber roller used in Example 1, was used as the stripping roller. A belt made of polyimide (manufactured by Gunze Co.) whose surface was treated by a silane coupling agent was used as the cleaning belt. The image forming and stripping apparatus shown in FIG. 5 (hereinafter referred to as "modified apparatus") was formed by modifying an "A color 630" copier in the above mentioned manner.

Four hundred parts of "Orgatics SIC-434" (manufactured by Matsumoto Kosho Co.) containing methyltriisocyanatesilane and 600 parts of ethyl acetate were mixed by stirring to obtain a coating liquid. The coating liquid was penetrated into a Xerox JD paper of A4 size (manufactured by Fuji Xerox Co.), and the paper was air dried for 15 min, and then subjected a heat treatment in an oven at 115° C. for 1 min so as to obtain an image recording paper with a paper surface having releasability. A black and white image and a color image were formed on this image recording paper by using a color copier (trade name "A color 630" made by Fuji Xerox Co.), and were fixed thereon.

The image recording paper on which the images were recorded was reproduced by using the modified apparatus. An image recording paper from whose surface a toner was stripped and removed to the extent that a character image was hardly recognizable was discharged. The above mentioned processes of image formation and reproduction were further repeated ten times, and a reproduced image recording paper was in a condition such that no problems were presented to actual use thereof.

Example 22

Evaluation was conducted in the same way as in Example 21 but by using an apparatus which was constructed in such a way that the stripping roller prepared in Example 7 was used and installed in the apparatus used in Example 21. Results similar to those in Example 21 were obtained.

Example 23

Evaluation was conducted in the same way as in Example 21, but by using an apparatus which was constructed in such a way that the stripping roller prepared in Example 9 was used and installed in the apparatus used in Example 21. Results similar to those in Example 21 were obtained.

Example 24

Evaluation was conducted in the same way as in Example 21 but by using an apparatus which was constructed in such a way that the stripping roller prepared in Example 10 was used and installed in the apparatus used in Example 21. Results similar to those in Example 21 were obtained.

Example 25

Eighty parts of resin (4), as a resin containing a component imparting releasability, was dissolved in 480 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was installed in the image stripping apparatus used in Example 21. The performance was evaluated in the same way as in Example 21, and similar results to those of Example 21 were obtained.

Example 26

A stripping roller whose surface layer was 20 μm in thickness was prepared in the same way as in Example 25 except that resin (5) was used as the resin containing a component imparting releasability. The thus prepared stripping roller was installed in the image stripping apparatus used in Example 21. The performance was evaluated in the same way as in Example 21, and similar results to those of Example 21 were obtained.

Example 27

A stripping roller whose surface layer was 20 μm in thickness was prepared in the same way as in Example 25 except that resin (6) was used as the resin containing a component imparting releasability. The thus prepared stripping roller was installed in the image stripping apparatus used in Example 21. The performance was evaluated in the same way as in Example 21, and similar results to those of Example 21 were obtained.

Example 28

A stripping roller whose surface layer was 20 μm in thickness was prepared in the same way as in Example 25 except that resin (7) was used as the resin containing a component imparting releasability. The thus prepared stripping roller was installed in the image stripping apparatus used in Example 21. The performance was evaluated in the same way as in Example 21, and similar results to those of Example 21 were obtained.

Comparative Example 4

Reproduction of an image recording paper was tested in the same way as in Example 21 except that the stripping roller prepared in Comparative Example 1 was used. Abnormal noises were generated within the apparatus, and the image recording paper was not discharged. The interior of the apparatus was inspected and it was found that the image recording paper adhered to the stripping roller in a winding manner and could not be separated from the stripping roller. Moreover, the stripping roller could no longer be used.

Example 29

The image forming and stripping apparatus of Example 21 was used except that the stripping roller used in Example 5 was used and the stripping liquid applying unit shown in FIGS. 12, 13 was installed in the previous step in the fixing and stripping unit (see FIG. 11). A silicone oil (trade name "KF54" manufactured by Shin-Etsu Chemical Industry Co.) was used instead of a stripping liquid. Reproduction of an image recording paper was tested by using this image forming and stripping apparatus and in the same way as in Example 21. An image recording paper, from whose surface toner was stripped and removed to the extent that edge portions of character images were somewhat recognizable, was discharged. Image formation and reproduction were further repeated ten times and the image recording paper was slightly dirtied, but was still in a condition such that no problems were presented to actual use thereof.

Example 30

Reproduction of an image recording paper was tested in the same way as in Example 29, except that the stripping roller used in Example 1 was used and a silicone oil (trade name "TSP451" manufactured by Toshiba Silicone Co., having a viscosity of 50 centistokes) was used instead of the stripping liquid. Results similar to those of Example 29 were obtained.

Example 31

Reproduction of an image recording paper was tested in the same way as in Example 29, except that the stripping roller used in Example 7 was used and a silicone oil (trade name "TSF451" manufactured by Toshiba Silicone Co., having a viscosity of 50 centistokes) was used instead of the stripping liquid. Results similar to those of Example 29 were obtained.

Example 32

Reproduction of an image recording paper was tested in the same way as in Example 29 except that the stripping roller used in Example 9 was used and a silicone oil (trade name "TSF451" manufactured by Toshiba Silicone Co. a viscosity of 50 centistokes) was used. Results similar to those of Example 29.

Example 33

Reproduction of an image recording paper was tested in the same way as in Example 29, except that the stripping roller used in Example 10 was used and a silicone oil (trade name "TSF451" manufactured by Toshiba Silicone Co., having a viscosity of 50 centistokes) was used instead of the stripping liquid. Results similar to those of Example 29 were obtained.

Example 34

Seven hundred and fifty parts of a silicone adhesive (trade name "TSR1515A" manufactured by Toshiba Silicone Co.) as an affinitive material and 7.5 parts of a crosslinking agent thereof (trade name "TSR1515B" manufactured by Toshiba Silicone Co.) were added to 1150 parts of toluene, and the mixture was stirred to be mixed. One hundred parts of silicone resin fine particles (trade name "Tosparl3120" manufactured by Toshiba Silicone Co., having a perfect spherical shape and an average particle diameter of 12 μm) was mixed in by stirring so as to obtain a coating liquid. The coating liquid was applied by dipping a roller which was prepared in such a manner that a silicone rubber layer of 2.0 mm was provided on the peripheral surface of a substrate pipe of 40 mm in diameter and 2 mm in thickness. The roller to which the coating liquid was applied was heated at 120° C. for 15 min, and a stripping roller having a surface layer of 20 μm in thickness was thereby obtained. The thus obtained stripping roller was used in place of the image stripping roller of the apparatus of Example 21, and reproduction of an image recording paper was conducted in the same way as in Example 21. An image recording paper, from which toner was stripped and removed to the extent that character images were hardly discernible, was discharged. Image formation and reproduction were further repeated ten times, and the image recording paper was in a condition such that no problems were presented to actual use thereof.

Example 35

Seventy parts of the resin (4), serving as a resin containing a component imparting releasability, was used, 7 parts of silicone resin fine particles (trade name "Tosparl3120" manufactured by Toshiba Silicone Co., having a perfect spherical shape and an average particle diameter of 12 μm) were added to the resin (4), and this mixture was dissolved in 460 parts of ethyl acetate to obtain a coating liquid. The coating liquid was applied by dipping a roller which was prepared in such a manner that a silicone rubber layer of 1.6 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was used, and reproduction of a paper was evaluated in the same way as in Example 21. Similar results to those of Example 21 were obtained.

Example 36

Eighty parts of resin (5), as a resin containing a component imparting releasability, was used, 20 parts of acrylic resin fine particles (trade name "MBX-30" manufactured by Sekisui Kasei Co., having a perfect spherical shape and an average particle diameter of 27.2 μm) were added to the resin (4), and this mixture was dissolved in 500 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was used, and reproduction of a paper was evaluated in the same way as in Example 21. Similar results to those of Example 21 were obtained.

Example 37

Seventy parts of resin (6), as a resin containing a component imparting releasability, was used, 30 parts of styrene base resin fine particles (trade name "SBX-17" manufactured by Sekisui Kaseihin Kogyo Co., having a perfect spherical shape and an average particle diameter of 16.2 μm)

was added to the resin (6), and this mixture was dissolved in 500 parts of ethyl acetate to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min and a stripping roller having a surface layer of 20 μm in thickness was thereby obtained. The thus obtained stripping roller was used, and reproduction of a paper was evaluated in the same way as in Example 21. Similar results to those of Example 21 were obtained.

Example 38

Eighty parts of resin (7) as a resin containing a component imparting releasability was used, 8 parts of benzoguanamine-formaldehyde resin fine particles (trade name "Eposter L-15" manufactured by Nihon Catalyst Co., having a perfect spherical shape and an average particle diameter of 15 μm) were added to the resin (7), and this mixture was dissolved in 500 parts of ethyl acetate to obtain a coating liquid. The coating liquid was applied by dipping a roller which was prepared in such a manner that a silicone rubber layer of 2.0 mm was provided on the peripheral surface of a stainless steel substrate pipe of 40 mm in diameter and 2 mm in thickness. The roller to which the coating liquid was applied was heated at 115° C. for 15 min, and a stripping roller having a surface layer of 20 μm in thickness was thereby obtained. The thus obtained stripping roller was used, and reproduction of a paper was evaluated in the same way as in Example 21. Similar results to those of Example 21 were obtained.

Example 39

A copier "Able 1301α" (made by Fuji Xerox Co.) was modified in the following way. The fixing unit was replaced with the fixing and stripping unit shown in FIG. 9. The stripping roller used in Example 5 was used as the stripping roller therefor. Moreover, a reproduced paper tray, in which an image recording papers for reproduction (image recording papers for stripping) on which images were formed were inserted, was set. The machine was modified so as to be changeable between fixing mode and a stripping mode. When the fixing mode was selected, paper was fed from an ordinary paper tray in which unused image recording papers were placed. When the stripping mode was selected, paper was fed from the reproduction paper tray. The paper used in Example 21 was used as the image recording paper.

The fixing mode was selected, and an image was formed on the image recording paper by a black toner and was fixed thereon. Then, an image recording paper, on which an image was recorded, was set in the reproduction paper tray, and the image recording paper was reproduced by selection of the stripping mode. An image recording paper, from which toner was stripped and removed to the extent that character images were hardly discernible, was discharged. Image formation and reproduction were further repeated ten times, and the image recording paper was in a condition such that no problems were presented to actual use thereof.

Example 40

Synthesis of Resin (8)

In accordance with the same method as that used for resin (1), the following starting compounds were reacted until the softening point reached 110° C., and resin (8) was obtained. Tg of the obtained resin (8) was 60° C.

| | |
|---|---|
| polyoxypropylene (2,2)-2,2-bis(4-hydroxyphenyl) propane | 300 parts |
| polyoxyethylene (2,2)-2,2-bis(4-hydroxyphenyl) propane | 250 parts |
| terephthalic acid | 260 parts |
| n-dodecenylsuccinic acid | 210 parts |

Preparation of Stripping Roller and Evaluation Thereof

Forty parts of the resin (8) as the thermally-fusible material and 40 parts of a thermosetting silicone resin (trade name "PHC587" manufactured by Toshiba Silicone Co.) as the releasing material were added to 400 parts of toluene, and the mixture was stirred to dissolve, and a coating liquid was thereby obtained. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller to which the coating liquid was applied was subjected to a heat treatment at 130° C. for 60 min, so that a stripping roller having a surface layer of 25 μm thickness was obtained.

The thus prepared stripping roller was installed in the image stripping apparatus used in Example 1. The performance was evaluated in the same way as in Example 1 and similar results to those of Example 1 were obtained.

Example 41

Synthesis of Compatibilizing Agent (1)

73.2 parts (0.3 mol) of 2,6-naphthalenedicarbonic acid dimethyl ester, 135.8 parts (0.7 mol) of dimethyl terephthalate, 206.4 parts (0.6 mol) of 2,2-di(4-hydroxypropoxyphenyl)propane, 124.0 parts (2.0 mol) of ethylene glycol, 0.27 part (0.8 mmol) of tetrabutyl titanate, and 111.4 parts (0.2 mol) of epoxy-group-containing dimethyl polysiloxane represented by following formula (1) were placed in a 1 liter glass flask equipped with a stirring device, a thermometer, a condenser, an ester adapter and a pressure reducing apparatus. The mixture was heated in a nitrogen stream in a mantle heater to carry out a methanol removing reaction at temperature in the range of 160 to 170° C. for 6 hours. The methanol removed by the ester adapter was 62.1 parts.

Formula (1)

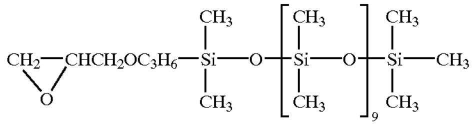

Then, the contents in the flask were heated to 220° C. over one hour, and thereafter, an ethylene glycol removing reaction was carried out for three hours under a reduced pressure of 20 mmHg at temperatures in the range of 220 to 240° C. The removed ethylene glycol was 71.2 parts. After the reaction was completed, the obtained polymer was cooled to room temperature, and 386.9 parts of a light-brown, semi-transparent solid material was obtained. The weight average molecular weight by GPC was 20,000 in styrene conversion, the glass transition point was 66° C. as measured by DCS (a differential thermal analyzer), and the softening point as measured by a ring and ball method was 115° C. The hydroxyl value (JISK0070) was 25.7 mg KOH/g. A corresponding monomer composition was a polycarboxylic acid with a mole ratio shown in the following formula (2) and a polyhydric alcohol with a mole ratio shown in following formula (3). Dimethylpolysiloxane was quantitatively analyzed by an atomic absorption analysis, and 19.9% by weight of the obtained polymer was dimethypolysiloxane. This was used as compatibilizing agent (1).

Formula (2)

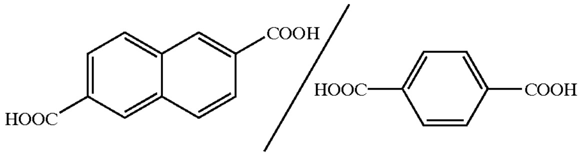

= 0.30/0.70

Formula (3)

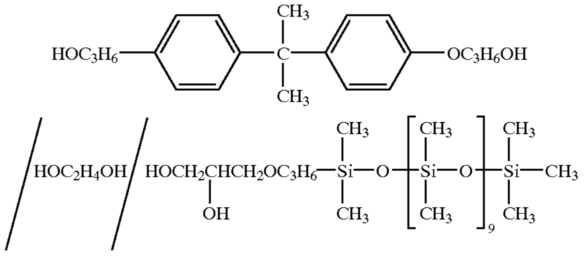

= 0.30/0.50/0.10

Preparation of Stripping Roller and Evaluation Thereof

Thirty parts of a polyester resin of Example 40 as a thermally-fusible material and 30 parts of a silicone resin (trade name "TSR116" manufactured by Toshiba Silicone Co.) as a releasing material were added to 400 parts of ethyl acetate, and the mixture was stirred to be mixed. Then, 10 parts of the above compatibizing agent (1) (polyester and silicone copolymer) as a compatibilizing agent was added and dissolved so as to obtain a coating liquid. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller on which the coating liquid was applied was heated at 120° C. for 15 min, and a stripping roller having a surface layer of 30 μm in thickness was thereby obtained.

The thus obtained stripping roller was installed in the image stripping apparatus used in Example 1. Evaluation was carried out in the same way as in Example 1, and results similar to those of Example 1 were obtained.

Example 42

Synthesis of a Compatibilizing Agent (2)

196.6 parts (1.0 mol) of dimethyl terephthalate, 37.5 parts (0.3 mol) of phthalic anhydride, 285.5 parts (0.8 mol) of 2,2-di(4-hydroxypropoxyphenyl)propane, 157.1 parts (2.5 mol) of ethylene glycol, 23.3 parts (0.3 mol) of glycerin, and 0.33 part (1.0 mmol) of tetrabutyl titanate were placed in a 1 liter glass flask equipped with a stirring device, a thermometer, a condenser, an ester adapter and a pressure reducing apparatus. The mixture was heated in a nitrogen stream in a mantle heater to carry out a methanol removing reaction at 160 to 170° C. for 6 hours. The methanol removed by the ester adapter was 61.3 parts.

Then, the contents in the flask were heated to 220° C. over 1 hour, and thereafter, an ethylene glycol removing reaction was further carried out for three hours under a reduced pressure of 20 mmHg at 220 to 240° C. The removed ethylene glycol was 120.4 parts. After the reaction was completed, the obtained polymer was cooled to room temperature, and 471.4 parts of a light-brown, semi-transparent solid material was obtained. The weight average molecular weight by GPC was 10,260 in styrene conversion, the glass transition point was 67° C. as measured by DCS (a differential thermal analyzer), and the softening point as measured by a ring and ball method was 122° C. The hydroxyl value (JISK0070) was 38.6 mg KOH/g. A corresponding monomer composition was a polycarboxylic acid with a mole ratio shown in above formula (2) and a polyhydric alcohol with a mole ratio shown in above formula (3). Dimethylpolysiloxane was quantitatively analyzed by an atomic absorption analysis, and 19.9% by weight of the obtained polymer was dimethylpolysiloxane. Subsequently, 150 parts of a polyesterpolyol obtained in the synthesis example of compatibilizing agent (1) and 300 parts of toluene were placed in a 1 liter glass flask equipped with a stirring device, a thermometer, and a condenser, and were dissolved at 60° C. Then, 0.17 part of dimethyl tin dilaurylate and 17.8 parts of an isocyanate-group-containing organopolysiloxane represented by following formula (4) were added to the solution, and the resultant mixture was reacted in a nitrogen stream at 70° C. for 5 hours. IR spectrum analysis was conducted on the obtained reaction solution, and spectral absorptions were observed at 2260 $cm^{-1}$, 1094 $cm^{-1}$ and 1260 $cm^{-1}$ caused by the presence of an NCO group observed before the reaction was started. Therefore, the material obtained by the reaction was confirmed to be a polyester grafted with an organopolysiloxane. 151.2 parts of a light-brown, semi-transparent, solid silicone-graft polyester was obtained after toluene as a solvent was stripped and removed from the reaction solution. The weight average molecular weight of the resultant silicone-graft polyester measured by GPC was 11,500 in styrene conversion, the softening point as measured by a ring and ball method was 97° C., and the glass transition point as measured by DSC was 51° C. This was used as compatibilizing agent (2).

Formula (4)

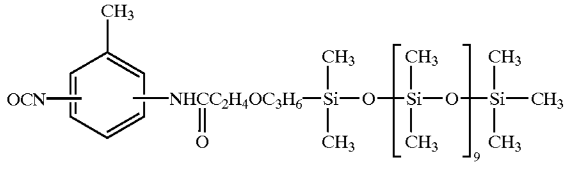

Preparation of Stripping Roller and Evaluation Thereof

In Example 41, a photo-curable silicone resin (trade name "UVHC1101" manufactured by Toshiba silicone Co.) instead of the silicon resin of Example 41, the above compatibilizing agent (2) (a silicone-graft polyester) as a compatibilizing agent, and 10 parts of dioctyl phthalate as a plasticizer were added to 400 parts of toluene and dissolved therein, and a coating liquid was thereby obtained.

The coating liquid was applied by dipping the same type of roller as that of Example 41. The roller was subjected to a heat treatment at 120° C. for 15 min, and then was subjected to a curing reaction in an ultraviolet irradiation apparatus at 120 $W/cm^2$ for 1 min, so that a stripping roller having a surface layer of 25 μm was obtained.

The thus prepared stripping roller was installed in the image stripping apparatus used in Example 1. Evaluation was carried out in the same way as in Example 1, and results similar to those of Example 1 were obtained.

Comparative Example 5

A stripping roller was prepared in the same way as in Example 40 except that the material forming the surface layer of the roller did not contain a releasing material. The roller was installed in the image stripping apparatus used in Example 1. Reproduction was conducted on a PET film under the same conditions as those in Example 1, and the PET film strongly adhered to the stripping roller in a winding manner, so that the image on the PET film could not stripped therefrom. The image stripping member also received much damage.

Example 43

Thirty parts of a photo-curable silicone resin (trade name "UVHC1103" manufactured by Toshiba Silicone Co.) instead of the silicon resin of Example 41, 10 parts of methyltriisocyanatesilane (trade name "OrgaticsSIC-434" manufactured by Matsumoto Seiyaku Co.) as an organic silicon compound, and 10 parts of an amino modified silicone oil (trade name "TSF4702" manufactured by Toshiba Silicone Co.) were added to 400 parts of ethyl acetate and mixed by stirring, and a coating liquid was thereby obtained. The coating liquid was applied by dipping a roller such as that of Example 41. The roller was subjected to a heat treatment at 120° C. for 15 min, and then was subjected to a curing reaction in an ultraviolet irradiation apparatus at 120 W/cm$^2$ for 1 min, so that a stripping roller having a surface layer of 30 $\mu$m thickness was obtained.

The thus prepared stripping roller was installed in the image stripping apparatus used in Example 1. Evaluation was carried out in the same way as in Example 1, and results similar to those of Example 1 were obtained.

Comparative Example 6

A coating liquid was prepared in the same way as in Example 41 except the compatibilizing agent (1) was not used. However, this coating liquid was cloudy white in a solvent, and insoluble components increased over time when it was left to stand. After the liquid was stirred, it was applied by dipping the same type of roller as that used in Example 41. The roller was subjected to a heat treatment at 120° C. for 15 min, so that a stripping roller which had a 30 $\mu$m thick surface layer was obtained.

The thus prepared stripping roller was installed in the image stripping apparatus used in Example 1. A film serving as an image recording medium was inserted into the image stripping apparatus. It was observed that toner locally remained on the surface of the film, and the toner accumulated as the above operation was repeated.

Example 44

Four hundred parts of "OrgaticsSIC-434" (manufactured by Matsumoto Seiyaku Co.) containing methylisocyanatesilane was mixed with 600 parts of ethyl acetate by stirring, and a coating liquid was obtained. A sheet of A4-size J paper for Xerox (manufactured by Fuji Xerox Co.) was immersed in the coating liquid and was dried for 5 min. Thereafter, the paper was subjected to a heat treatment in an oven at 115° C. for 1 min. Thus, an image recording paper having a paper surface endowed with releasability was obtained. A black and white image and a color image were formed and fixed on the image recording paper by using a color copier (trade name "A color 935" made by Fuji Xerox Co.).

The image recording paper was thereafter inserted in the same image stripping apparatus as used in Example 1 to test the image peelability. As a result, good reproduction as an image recording paper was achieved, and images such as a characters and solid and highlight parts of an image were stripped and removed to the extent that they could not be discerned. The process of printing of an image and stripping it was further repeated ten times, and there were no problems in practical use with respect to not only recordability onto the image recording paper but also peelability of the images.

Example 45

The image recording paper used in Example 44 was replaced by an A4-size L paper for Xerox (manufactured by Fuji Xerox Co.). A black and white copier (trade name "Vivace 550" made by Fuji Xerox Co.) was used as the image recording apparatus to form and fix a black and white image on the image recording paper.

Fifty parts of a styrene-acrylic resin (trade name "PSB2733" manufactured by Sanyo Kasei Co.) as a thermally-fusible material, 30 parts of a thermosetting silicone resin (trade name "PHC587" manufactured by Toshiba Silicone Co.), and 20 parts of a silicone acrylic varnish as a compatibilizing agent were added to 400 parts of toluene and dissolved by stirring so as to obtain a coating liquid. The coating liquid was applied by dipping a roller which was prepared in such a manner that a silicone rubber layer of 0.6 mm was provided on the peripheral surface of a stainless steel substrate pipe of 40 mm in diameter and 2 mm in thickness. The roller on which the coating liquid was applied was heated at 130° C. for 60 min, and a stripping roller having a surface layer of 25 $\mu$m in thickness was thereby obtained.

The roller was installed in the same type of image stripping apparatus as that of Example 1. The image recording paper, on which a black and white image was recorded, was inserted in the image stripping apparatus to test the image peelability. Good reproduction of an image recording paper was achieved, and images such as a characters and solid and highlight parts of images were stripped and removed to the extent that they could not be discerned. The process of printing of an image and stripping it was further repeated ten times, and there were no problems in practical use with respect to not only recordability onto the image recording paper but also peelability of images. A white paper, an ink jet paper, a heat transfer paper, and an OHP sheet were inserted in the image stripping apparatus and discharged to the exterior of the apparatus without any problems.

Example 46

Super fine exclusive-use paper (trade name "MJA4SP1" manufactured by Epson Co.) was inserted into an ink-jet printer (trade name "PM700C" manufactured by Epson Co.), and a color image was printed on the paper.

The thus printed paper was inserted into the image stripping apparatus of Example 45, and there arose no problems such as the ink-jet paper adhering to the image stripping apparatus in a winding manner or the like.

Example 47

Forty parts of a styrene-acrylic resin (trade name "PSB2733" manufactured by Sanyo Kasei Co.) as a thermally-fusible material, 40 parts of a photo-curable silicon resin (trade name "UVHC8553" manufactured by Toshiba Silicone Co.), 10 parts of an amino-modified silicone oil (trade name "KF861" manufactured by Shin-Etsu Chemical Industry Co.) and 1 part of a colloidal silica (trade name "R972" manufactured by Nippon Aerosil Co.) were added to 400 parts of toluene and mixed by stirring to obtain a coating liquid. The coating liquid was applied by dipping a roller which was prepared in such a manner that a silicone rubber layer of 1.2 mm was provided on the peripheral surface of a stainless steel substrate pipe of 40 mm in diameter and 2 mm in thickness. The roller to which the coating liquid was applied was heated at 115° C. for 15 min and thereafter subjected to a curing reaction in an ultraviolet irradiation apparatus at 120 W/$cm^2$ for 1 min to obtain a stripping roller having a surface layer of 28 $\mu$m in thickness.

The roller was installed in the same type of image stripping apparatus as that of Example 1, and peelability was tested in the same way as in Example 46. Good reproduction of an image recording paper was achieved, and images such as characters and solid and highlight parts of images were stripped and removed to the extent that they could not be discerned. The process of printing an image and stripping it was further repeated ten times, and there were no problems in practical use with respect to not only recordability onto the image recording paper but also peelability of images.

Comparative Example 7

Eighty parts of the styrene-acrylic resin in Example 47 (trade name "PSB2733" manufactured by Sanyo Kasei Co.), serving as a thermally-fusible material, alone was added to 400 parts of toluene and dissolved by stirring to obtain a coating liquid.

A stripping roller was prepared in the same way as in Example 47 by using the coating liquid. The roller was installed in the same type of image stripping apparatus as that of Example 1. A black and white copier (trade name "Vivace 550" made by Fuji Xerox Co.) was used as the image recording apparatus, and a black and white image was formed and fixed on an A4-size L paper for Xerox (manufactured by Fuji Xerox Co.). The paper on which a black and white image was fixed was inserted in the image stripping apparatus to test peelability of the image. However, the image recording paper strongly adhered to the stripping roller in a winding manner, so that the image could not stripped. Further, the image recording paper could not be completely removed from the image stripping member due to the great damage done to the surface of the image stripping member.

Since the present invention has the above-described structure, the present invention can provide an image stripping member with which easy reproduction of an image recording medium is made possible at offices or homes and good image peelability can be maintained over a long time, and which is applicable to general image recording media, and provides an image stripping apparatus and an image stripping method both using this image stripping member.

What is claimed is:

1. An image stripping member used for stripping an image forming material from an image recording medium by contacting the image forming material on the image recording medium, wherein a material forming a surface layer of the image stripping member has affinity and releasability with respect to the image recording material;

wherein said material forming the surface layer contains a releasing material and an affinitive material, or contains a material having both releasability and affinity;

wherein a plurality of holes each having a bottom are formed in the surface layer of the image stripping member; and wherein a material having releasability with respect to the image recording material or a material having both releasability and affinity with respect to the image recording material is filled in the holes.

2. An image stripping member according to claim 1, wherein a content of the releasing material contained in the surface layer is in a range of 5 to 80% by weight.

3. An image stripping member according to claim 1, wherein the affinitive material is one of a pressure sensitive adhesive and a thermally-fusible material.

4. An image stripping member according to claim 3, wherein the thermally-fusible material is the same resin as a resin contained in the image forming material.

5. An image stripping member according to claim 3, wherein the thermally-fusible material is homogeneously mixed with the releasing material.

6. An image stripping member according to claim 5, wherein the material forming the surface layer contains a compatibilizing agent for the thermally-fusible material and the releasing material.

7. An image stripping member according to claim 1, wherein the material having releasability and affinity is a resin containing a component imparting releasability.

8. An image stripping member according to claim 1, wherein the material forming the surface layer further contains fine particles.

9. An image stripping member according to claim 1, wherein the releasing material is at least one silicon compound selected from the group consisting of organic silicon compounds, silicone rubbers, silicone resins and silicone oils.

* * * * *